(12) United States Patent
Lazanja et al.

(10) Patent No.: US 9,657,963 B2
(45) Date of Patent: May 23, 2017

(54) HEATER FOR AN AUTOMOTIVE VEHICLE AND METHOD OF FORMING SAME

(71) Applicant: W.E.T. AUTOMOTIVE SYSTEMS, LTD, Windsor (CA)

(72) Inventors: Marinko Lazanja, Windsor (CA); Matthew Zuzga, Macomb, MI (US); Sergiu Csonti, Windsor (CA); Syed Iqbal, LaSalle (CA); Igor Spasojevic, Belle River (CA); Tim Normand, LaSalle (CA)

(73) Assignee: GENTHERM CANADA LTD., Windsor, Ontario (CA)

( * ) Notice: Subject to any disclaimer, the term of this patent is extended or adjusted under 35 U.S.C. 154(b) by 306 days.

(21) Appl. No.: 14/186,070

(22) Filed: Feb. 21, 2014

(65) Prior Publication Data

US 2014/0187140 A1    Jul. 3, 2014

Related U.S. Application Data

(63) Continuation of application No. 13/106,148, filed on May 12, 2011, now Pat. No. 8,702,164.
(Continued)

(51) Int. Cl.
*H05B 3/34* (2006.01)
*F24H 3/04* (2006.01)
(Continued)

(52) U.S. Cl.
CPC ............ *F24H 3/0411* (2013.01); *A47C 7/748* (2013.01); *B60N 2/5685* (2013.01); *H01C 17/06* (2013.01);
(Continued)

(58) Field of Classification Search
CPC ...... H05B 3/36; H05B 3/34; H05B 2203/016; H05B 2203/029; H05B 2203/006;
(Continued)

(56) References Cited

U.S. PATENT DOCUMENTS

| 1,475,912 A | 11/1923 | Williams |
| 1,553,461 A | 9/1925 | Negromanti |

(Continued)

FOREIGN PATENT DOCUMENTS

| DE | 3513909 | 10/1986 |
| DE | 3938951 A1 | 5/1990 |

(Continued)

OTHER PUBLICATIONS

Japanese Office Action, dated Jul. 18, 2014, Application No. 2013-510290.
(Continued)

*Primary Examiner* — Shawtina Fuqua
(74) *Attorney, Agent, or Firm* — The Dobrusin Law Firm, P.C.

(57) ABSTRACT

A heated seat comprising: a cushion with one or more trench areas; a heater comprising: a carrier with a periphery, the carrier further including: a first electrically functional layer that is made of a conductive material that substantially circumscribes at least a portion of the carrier; and a second electrically functional layer that is made of a resistive material; one or more electrical conductors attached to the first electrically functional layer; a trim layer that covers the cushion when the heater is placed over the cushion; and wherein the periphery includes a first side edge and a second side edge, and each side edge includes a cutout, and the cutouts are located adjacent to each other forming a neck portion; wherein the heater is attached to the cushion by placing an attachment device over the neck portion of the
(Continued)

heater and securing one or both ends of the attachment device to the cushion so that the neck portion is pulled into the trench; wherein the neck portion is free of the second electrically functional layer; and wherein the first electrically functional layer and the second electrically functional layer form a checkered pattern.

20 Claims, 14 Drawing Sheets

Related U.S. Application Data

(60) Provisional application No. 61/363,721, filed on Jul. 13, 2010, provisional application No. 61/348,881, filed on May 27, 2010.

(51) Int. Cl.
    *B60N 2/56*     (2006.01)
    *A47C 7/74*     (2006.01)
    *H01C 17/06*     (2006.01)
    *H05B 1/02*     (2006.01)
    *H05B 3/36*     (2006.01)

(52) U.S. Cl.
    CPC ........... *H05B 1/028* (2013.01); *H05B 1/0238* (2013.01); *H05B 3/36* (2013.01); *H05B 2203/006* (2013.01); *H05B 2203/016* (2013.01); *H05B 2203/029* (2013.01); *Y10T 29/49083* (2015.01)

(58) Field of Classification Search
    CPC ........ H05B 2203/003; H05B 2203/004; H05B 2203/013; H05B 2203/026; H05B 2203/02; H05B 2230/029; H05B 1/0238; H05B 1/028; B60N 2/5685; F24H 3/0411; A47C 7/748; Y10T 29/49083; H01C 17/06
    See application file for complete search history.

(56) References Cited

U.S. PATENT DOCUMENTS

| | | |
|---|---|---|
| 2,409,421 A | 10/1946 | Dufault |
| 2,978,972 A | 4/1961 | Hake |
| 3,014,117 A | 12/1961 | Madding |
| 3,221,145 A | 11/1965 | Hager |
| 3,287,684 A | 11/1966 | Armbruster, Jr. |
| 3,448,246 A | 6/1969 | Armbruster |
| 3,500,014 A | 3/1970 | Longo |
| 3,721,799 A | 3/1973 | Carlstrom |
| 3,877,788 A | 4/1975 | Spargue et al. |
| 3,892,946 A | 7/1975 | Rimmi |
| 4,032,752 A | 6/1977 | Ohmura et al. |
| 4,044,221 A | 8/1977 | Kuhn |
| 4,149,066 A | 4/1979 | Niibe |
| 4,245,149 A | 1/1981 | Fairlie |
| 4,247,756 A | 1/1981 | Cucinotta et al. |
| 4,335,725 A | 6/1982 | Geldmacher |
| 4,399,347 A | 8/1983 | Schmitt |
| 4,410,790 A | 10/1983 | Berf et al. |
| 4,436,986 A | 3/1984 | Carlson |
| 4,523,085 A | 6/1985 | Grise |
| 4,533,821 A | 8/1985 | Sato |
| 4,539,051 A | 9/1985 | Hacias |
| 4,542,285 A | 9/1985 | Grise |
| 4,626,664 A | 12/1986 | Grise |
| 4,628,187 A | 12/1986 | Sekiguchi et al. |
| 4,633,068 A | 12/1986 | Grise |
| 4,656,339 A | 4/1987 | Grise |
| 4,661,689 A | 4/1987 | Harrison |
| 4,665,304 A | 5/1987 | Spencer |
| 4,695,091 A | 9/1987 | Altmann et al. |
| 4,713,531 A | 12/1987 | Fennekels et al. |
| 4,719,335 A | 1/1988 | Batliwalla et al. |
| 4,725,717 A | 2/1988 | Harrison |
| 4,743,741 A | 5/1988 | Ramus |
| 4,752,672 A | 6/1988 | Grise |
| 4,761,541 A | 8/1988 | Batliwalla et al. |
| 4,777,351 A | 10/1988 | Batliwalla et al. |
| 4,857,711 A | 8/1989 | Watts |
| 4,868,898 A | 9/1989 | Seto |
| 4,888,089 A | 12/1989 | Marstiller et al. |
| 4,892,998 A | 1/1990 | Marstiller et al. |
| 4,912,306 A | 3/1990 | Grise et al. |
| 4,923,248 A | 5/1990 | Feher |
| 4,931,627 A | 6/1990 | Watts |
| 4,964,674 A | 10/1990 | Altmann et al. |
| 5,015,824 A | 5/1991 | Monter et al. |
| 5,019,797 A | 5/1991 | Marstiller et al. |
| 5,025,136 A | 6/1991 | Doege et al. |
| 5,034,594 A | 7/1991 | Beezhold et al. |
| 5,045,673 A | 9/1991 | Kelly |
| 5,057,674 A | 10/1991 | Smith-Johannsen |
| 5,081,339 A | 1/1992 | Stine |
| 5,111,025 A | 5/1992 | Barma et al. |
| 5,132,840 A | 7/1992 | Okada et al. |
| 5,155,334 A | 10/1992 | Marstiller et al. |
| 5,181,006 A | 1/1993 | Shafe et al. |
| 5,187,350 A | 2/1993 | Tsuchiya |
| 5,197,595 A | 3/1993 | Coultas |
| 5,198,639 A | 3/1993 | Smuckler |
| 5,206,482 A | 4/1993 | Smuckler |
| 5,335,381 A | 8/1994 | Chang |
| 5,344,591 A | 9/1994 | Smuckler |
| 5,354,966 A | 10/1994 | Sperbeck |
| 5,414,241 A | 5/1995 | Ohashi et al. |
| 5,418,025 A | 5/1995 | Harmand et al. |
| 5,422,462 A | 6/1995 | Kishimoto |
| 5,432,322 A | 7/1995 | Ingram et al. |
| 5,451,747 A | 9/1995 | Sullivan et al. |
| 5,477,033 A | 12/1995 | Bergholtz |
| 5,516,189 A | 5/1996 | Ligeras |
| 5,626,021 A | 5/1997 | Karunasiri et al. |
| 5,643,480 A | 7/1997 | Gustavsson et al. |
| 5,679,277 A | 10/1997 | Niibe et al. |
| 5,702,565 A | 12/1997 | Wu et al. |
| 5,716,536 A | 2/1998 | Yokoto et al. |
| 5,800,483 A | 9/1998 | Vought |
| 5,800,595 A | 9/1998 | Wright |
| 5,801,914 A | 9/1998 | Thrash |
| 5,824,993 A | 10/1998 | Chrysochoos et al. |
| 5,824,994 A | 10/1998 | Noda et al. |
| 5,824,996 A | 10/1998 | Kochman et al. |
| 5,897,162 A | 4/1999 | Humes et al. |
| 5,904,874 A | 5/1999 | Winter |
| 5,921,314 A | 7/1999 | Schuller et al. |
| 6,057,530 A | 5/2000 | Gurevich |
| 6,064,037 A | 5/2000 | Weiss et al. |
| 6,070,115 A | 5/2000 | Oestreicher et al. |
| 6,084,217 A | 7/2000 | Bulgajewski |
| 6,093,910 A | 7/2000 | McClintock et al. |
| 6,124,577 A | 9/2000 | Fristedt |
| 6,147,332 A | 11/2000 | Holmberg et al. |
| 6,150,642 A | 11/2000 | Weiss et al. |
| 6,164,719 A | 12/2000 | Rauh |
| 6,229,123 B1 | 5/2001 | Kochman et al. |
| 6,278,090 B1 | 8/2001 | Fristedt et al. |
| 6,294,758 B1 | 9/2001 | Masao et al. |
| 6,307,188 B1 | 10/2001 | Bulgajewski |
| 6,369,369 B2 | 4/2002 | Kichman et al. |
| 6,415,501 B1 | 7/2002 | Schlesselman |
| 6,439,658 B1 | 8/2002 | Ganz et al. |
| 6,452,138 B1 | 9/2002 | Kochman et al. |
| 6,455,823 B1 | 9/2002 | Bulgajewski et al. |
| 6,495,809 B2 | 12/2002 | Bulgajewski et al. |
| 6,501,055 B2 | 12/2002 | Rock et al. |
| 6,512,203 B2 | 1/2003 | Jones et al. |
| RE38,128 E | 6/2003 | Gallup et al. |
| 6,619,736 B2 | 9/2003 | Stowe et al. |
| 6,629,724 B2 | 10/2003 | Ekern et al. |

(56) References Cited

U.S. PATENT DOCUMENTS

| | | |
|---|---|---|
| 6,664,512 B2 | 12/2003 | Horey et al. |
| 6,664,518 B2 | 12/2003 | Fristedt et al. |
| 6,676,207 B2 | 1/2004 | Rauh et al. |
| 6,686,562 B1 | 2/2004 | Weiss et al. |
| 6,710,303 B1 | 3/2004 | Lorenzen |
| 6,713,733 B2 | 3/2004 | Kochman et al. |
| 6,838,647 B2 | 1/2005 | Nagele |
| 6,840,576 B2 | 1/2005 | Ekern et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,872,882 B2 | 3/2005 | Fritz |
| 6,884,965 B2 | 4/2005 | Nelson et al. |
| 6,892,807 B2 | 5/2005 | Fristedt et al. |
| 6,893,086 B2 | 5/2005 | Bajic et al. |
| 6,976,734 B2 | 12/2005 | Stoewe |
| 7,036,283 B2 | 5/2006 | Halas |
| 7,040,710 B2 | 5/2006 | White et al. |
| 7,052,091 B2 | 5/2006 | Bajic et al. |
| 7,053,344 B1 | 5/2006 | Surjan et al. |
| 7,083,227 B2 | 8/2006 | Brennan et al. |
| 7,100,978 B2 | 9/2006 | Ekern et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,202,444 B2 | 4/2007 | Bulgajewski |
| 7,205,510 B2 * | 4/2007 | Howick ............... B60N 2/5685 219/217 |
| 7,213,876 B2 | 5/2007 | Stoewe |
| 7,223,948 B2 | 5/2007 | Howick et al. |
| 7,285,748 B2 | 10/2007 | Nelson et al. |
| 7,301,441 B2 | 11/2007 | Inada et al. |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,475,938 B2 | 1/2009 | Stoewe et al. |
| 7,478,869 B2 | 1/2009 | Lazanja et al. |
| 7,500,536 B2 | 3/2009 | Bulgajewski et al. |
| 7,506,938 B2 | 3/2009 | Brennan et al. |
| 7,510,239 B2 | 3/2009 | Stowe |
| 7,560,670 B2 | 7/2009 | Lorenzen et al. |
| 7,587,901 B2 | 9/2009 | Petrovski |
| 7,618,089 B2 | 11/2009 | Stoewe et al. |
| 7,637,569 B2 | 12/2009 | Krobok et al. |
| 7,741,582 B2 | 6/2010 | Howick et al. |
| 2002/0117495 A1 | 8/2002 | Kochman et al. |
| 2003/0111454 A1 | 6/2003 | Ishiyama et al. |
| 2004/0100131 A1 | 5/2004 | Howick et al. |
| 2005/0242081 A1 | 11/2005 | Howick |
| 2006/0015801 A1 | 1/2006 | Suh et al. |
| 2006/0138810 A1 | 6/2006 | Knoll et al. |
| 2006/0249995 A1 | 11/2006 | Stoewe et al. |
| 2007/0176471 A1 | 8/2007 | Knoll |
| 2008/0179306 A1 | 7/2008 | Howick et al. |
| 2009/0218855 A1 | 9/2009 | Wolas |
| 2010/0038356 A1 | 2/2010 | Fukuda et al. |
| 2010/0038357 A1 | 2/2010 | Fukuda et al. |
| 2010/0219664 A1 | 9/2010 | Howick et al. |
| 2010/0326976 A1 | 12/2010 | Nakajima et al. |
| 2011/0226751 A1 | 9/2011 | Lazanja et al. |
| 2012/0049586 A1 | 3/2012 | Yoshimoto et al. |
| 2012/0228903 A1 | 9/2012 | Abe et al. |

FOREIGN PATENT DOCUMENTS

| | | |
|---|---|---|
| DE | 199 20 451 | 12/1999 |
| DE | 10027173 A1 | 12/2001 |
| GB | 2010650 A | 6/1979 |
| JP | 56093284 A | 7/1981 |
| JP | 62-070391 | 5/1987 |
| JP | H01-163989 | 6/1989 |
| JP | H06-132069 A | 5/1994 |
| JP | 2006-054131 A | 2/2006 |
| JP | 2006-507652 | 3/2006 |
| JP | 2006-324182 | 11/2006 |
| JP | 2007-052945 A | 3/2007 |
| JP | 2007-227830 A | 9/2007 |
| JP | 2008-238926 A | 10/2008 |
| WO | 8906480 A1 | 7/1989 |
| WO | 94/09684 A1 | 5/1994 |
| WO | 9701549 A1 | 1/1997 |
| WO | 02/06914 A1 | 1/2002 |
| WO | 03/101777 | 12/2003 |
| WO | 2005/047056 | 5/2005 |

OTHER PUBLICATIONS

International Search Report and Written Opinion, Application No. PCT/US2011/036202, dated Aug. 17, 2011.
Automotive Heated Seats—Heated Steering Wheels, IGB Automotive Ltd., received by Assignee W.E.T. Automotive Systems, May 2003.
Automotive Seat Heating Systems, Bauerhin International, received by Assignee W.E.T. Automotive Systems, May 2002.
GMT 830 Heating & Ventilation System, IGB Automotive Ltd., received by Assignee W.E.T. Automotive Systems, Jun. 2003.
Co-pending U.S. Appl. No. 10/715,160, filed Nov. 17, 2003, U.S. Pat. No. 7,306,283.
Co-pending U.S. Appl. No. 11/923,091, filed Oct. 24, 2007, U.S. Pat. No. 7,741,582.
Co-pending U.S. Appl. No. 12/778,238, filed May 12, 2010, published as 2010/0219664.
Co-pending US National Phase, U.S. Appl. No. 13/256,318, filed Sep. 13, 2011.
DuPont Microcircuit Materials, Product Description, 5000 Silver Conductor, received by Assignee W.E.T. Apr. 2008.
DuPont 5064,Technical Data Sheet, Product Description, recieved by Assignee W.E.T. Mar. 2011.
DuPont Microcircuit Materials, 7282 PTC Carbon Resistor, Product Description, Thich Film Composition, Apr. 2005.
Translation of the Office Action from Japanese Patent Applicatiion No. 2013/510290, dated Nov. 19, 2013.
First Chinese Office Action dated Nov. 30, 2016; Application No. 2012105085153.

* cited by examiner

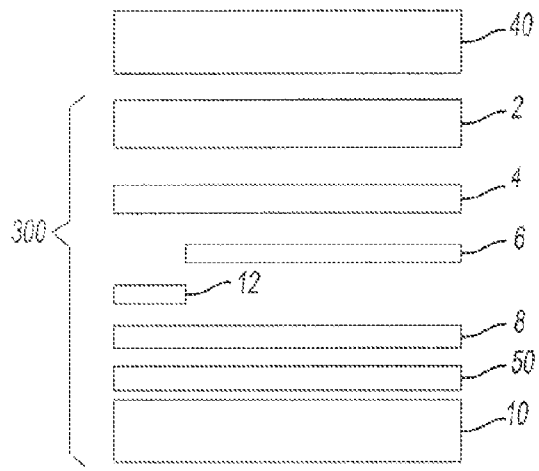
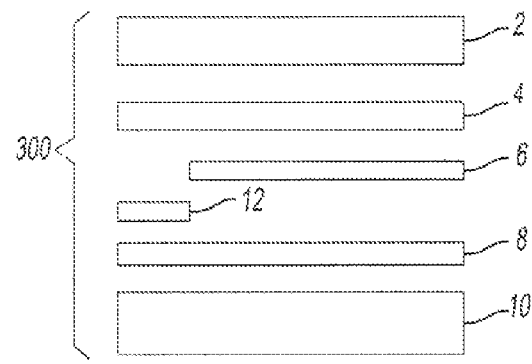
Fig -2A    Fig -2B
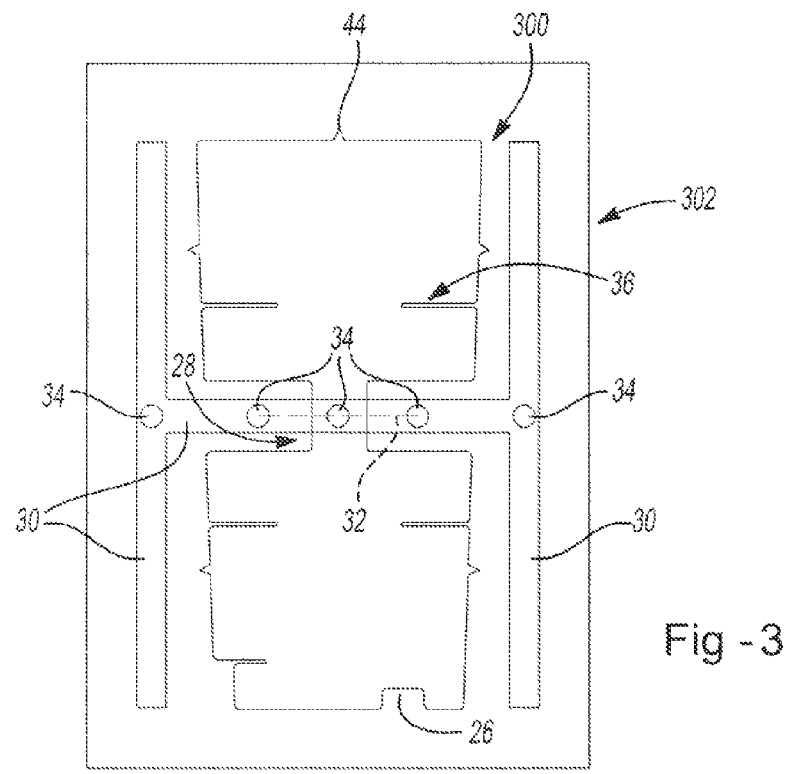
Fig -3

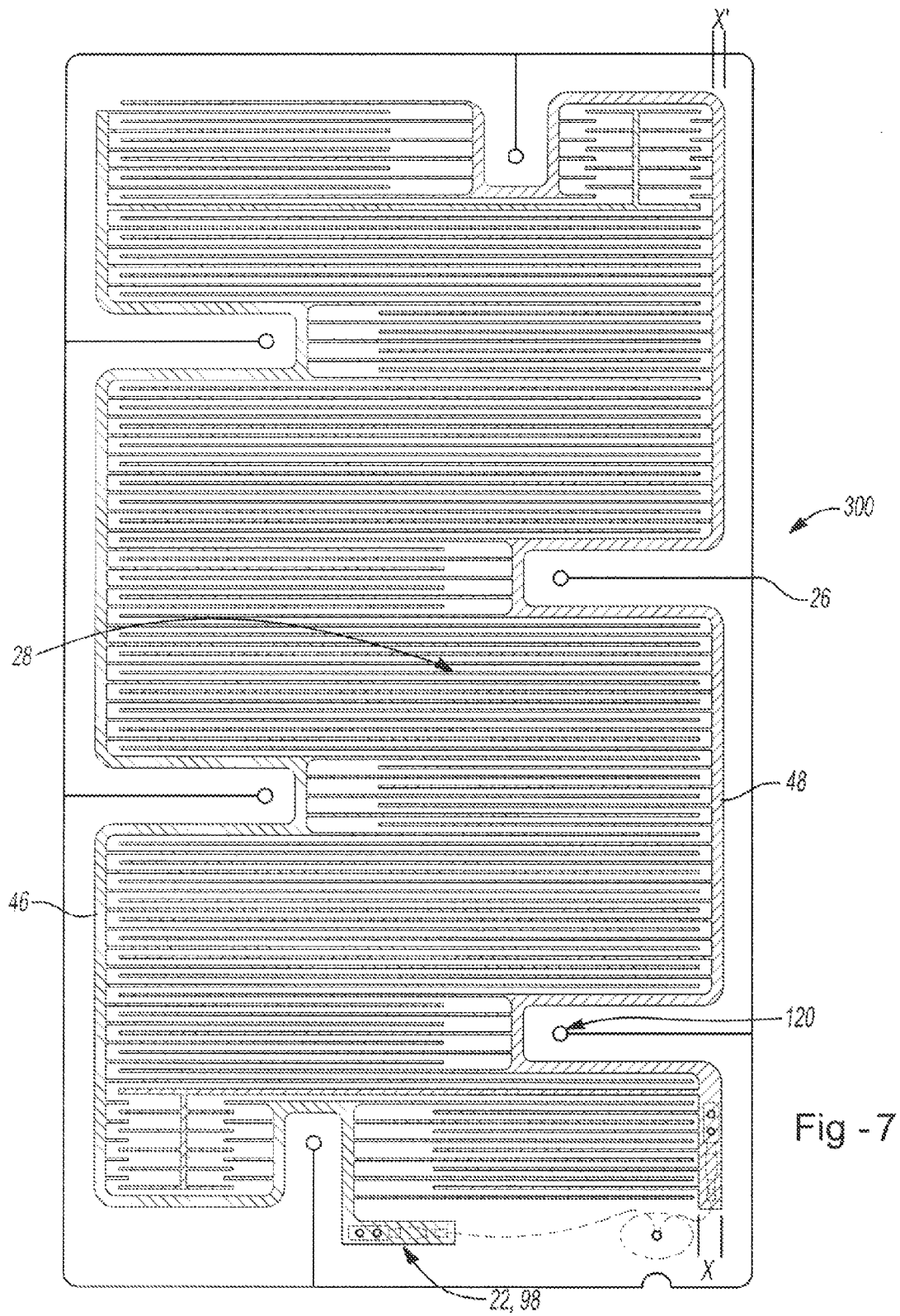

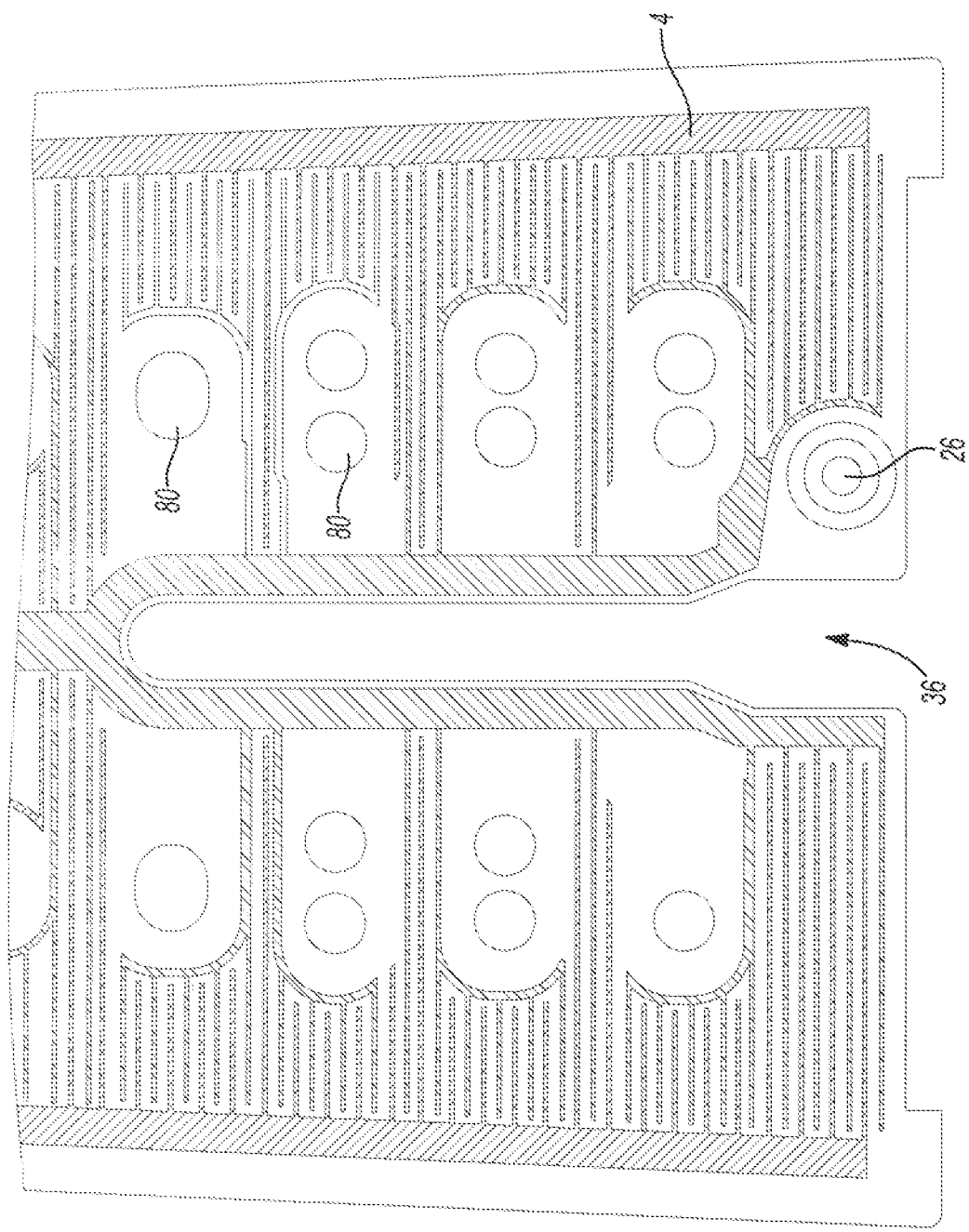

HEATER FOR AN AUTOMOTIVE VEHICLE AND METHOD OF FORMING SAME

CLAIM OF PRIORITY

The present teachings are related to U.S. Provisional Application Ser. No. 61/348,881 filed May 27, 2010, and U.S. Provisional Application Ser. No. 61/363,721 filed Jul. 13, 2010, the contents of which are incorporated by reference herein.

FIELD

The present teachings relate generally to heaters and more particularly to heaters for use in seats, mirrors, arm rest, handles, around a battery, or other locations of automotive vehicles, transportation vehicles, or other articles of manufacture.

BACKGROUND

For many years, industry has been concerned with designing improved heaters for articles of manufacture such as seats, mirrors, handles of furniture, automotive vehicles, or other transportation vehicles. Examples of such heaters are disclosed in U.S. Pat. Nos. 7,560,670; 7,285,748; 7,223,948; 7,202,444; 6,872,882; 6,838,647; 6,710,303; 6,686,562; 6,307,188; 6,150,642; 6,084,217; 5,451,747; 5,045,673; 4,931,627; 4,857,711; and 4,777,351 all of which are expressly incorporated herein by reference for all purposes. However, the heaters disclosed in these patents suffer from drawbacks. For example, as described, one or more of these heaters may be limited in the ability to successfully offer different heat output levels when in use; the construction may lead to noise due to passenger shifting; the construction may have installation limitations due to their shape and/or their relatively rigid structures; and/or they may be otherwise subject to damage from repeated use.

Other disadvantages faced by these heaters are that they are unable to conform to the contours of the seat. Typically, these heaters are a solid square configuration, and this configuration is not capable of conforming to the contours of a seat, especially a seat containing a user. More recently seat heaters have begun adding holes or other configurations into the center of the heater; however, these still have not addressed problems faced with adapting a heater to a seat with a bite line, trenches, channels, and other contours.

As can be appreciated, seat trenches pose substantial design challenges. Typically, the location, geometry, and/or dimensions of a trench are dictated by a seat manufacturer based upon the needs of the seat for a particular textile, functionality of the seat, trim tie-down needs, or any combination thereof. Vehicle to vehicle, trench design may vary in location, orientation, geometry, and/or dimension, depending upon the particular needs of a seat. A trench design suitable for one seat may perform unpredictably for another. It is also important to take into account that within trenches, a heater is going to be subjected to deformation, and repeated cyclical loading, both potentially affecting wear and fatigue characteristics. Further, it is often desired or necessary to employ separate, but electrically connected, heating zones on opposite sides of a trench. This poses a unique design difficulty inasmuch as electrodes for achieving the electrical communication will generally need to be able to conform substantially to the shape of the trench, and/or allow for reliable and reproducible folding and/or flexing. Accordingly, it has been identified by the present inventors that it is important to employ particular designs for heaters to make them more readily adaptable from seat to seat.

U.S. Pat. No. 7,306,283, the teachings of which is incorporated by reference herein for all purposes, illustrates one particularly attractive approach for a heater design that makes the heater attractive for trench applications. See also, U.S. Pat. No. 7,205,510 (incorporated by reference). In the interest of improving upon existing technology in this field, the present teachings provide a heater that is particularly suitable for use in seats (especially seats with trenches) of automotive vehicles, but which may be adapted for application in other transportation vehicles, or other articles of manufacture as well.

Another challenge that flexible seat heaters face is in connecting wires to the flexible carrier, a first electrically conductive layer, a second electrically conductive layer, or a combination thereof. Generally, it is difficult to attach wires to form an electrical connection because the use of high temperature fusion techniques (which may be associated with certain attractive attachment approaches) cannot be employed without damaging the carrier. Furthermore, one or more of the electrically conductive layers are very thin and provide only small amounts of material to which wires can be attached. Accordingly, it has long been the practice in the art to attach electrical lines and/or electrical conductors (e.g. wires) to heaters by mechanical fasteners (e.g. brass or copper connector), and more specifically by using riveted electrical terminal structures. In those approaches, commonly one or more hole is made in a flexible heater layer through which a fastener (e.g. a rivet) is securingly positioned. In some designs, this process can be expensive, labor intensive, part intensive (e.g. five or more parts are used), and time consuming. Typical mechanical fasteners employed include a backing plate, a male portion, two rivets, and a crimp portion, and each part must be handled and attached to the carrier so that the electrical connection can be formed. Further, for some designs, attachment structures may require complicated installation techniques. Hardware selection also tends to be constrained as a result of a finite selection of available terminal structures for riveting applications. The present teachings seek to eliminate at least some of the parts and the labor (i.e. time) associated with attachment of this type, while still providing a robust and durable attachment.

In addition, historically, heaters of the present type have been designed with electrode structures having discrete ends, to which electrical connections are made. Once the end is defined, all connections must thereafter be made at such electrode power application connection ends. This makes it difficult to design seat heaters that have widespread application across a variety of seats. Packaging needs for individual seats will vary and may not permit consistent use of such application end locations. Furthermore, the size of the wires used in conjunction with seat heaters have prohibited attachment by any other method. Currently, seat heaters typically employ an 18, 16, 14 gauge wire, or larger to provide an adequate power supply to heat the seat. Such a larger gauge wire has been used to help provide an adequate power supply to the heater so that the heater can be quickly heated. In one of its aspects, the present teachings provide an elegantly simple solution to the problems that have constrained wire selection, so that a smaller gauge wire optionally may be employed without sacrificing performance or device integrity.

Another challenge faced by seat heaters is providing a seat heater with multiple temperature settings, zones, or both where the seat heater exhibits a substantially consistent temperature profile across the heated portion. Historically, seat heaters vary the temperature setting using a combination of different methods. For example, in one method the seat heater may include resistors having different resistances so that power is reduced and/or increased (e.g. based upon which resistance path is chosen) thereby varying the temperature of the heater. Another example is a seat heater that adds or subtracts zones, rings, branches, the like, or a combination thereof, so that the temperature will increase and/or decrease accordingly. The present teachings seek to eliminate the need for additional resistors, zones, or both, and provide a more consistent temperature profile across the heated portion of the seat heater.

SUMMARY

In a general sense, there is disclosed a heated seat, a heater, and a method of forming the same. The heated seat may include a cushion (i.e. a seat cushion, a back cushion, a bolster, or a combination thereof) with or without one or more trenches. The heater may comprise a flexible carrier (e.g., a carrier including at least one polymeric film layer). The heater may include two or more conductive electrodes (e.g., electrodes that are applied to a polymeric film layer by a printing technique or otherwise applied to form a laminate). One or more resistive layer may be applied on the flexible carrier and in electrical communication with the conductive electrodes; any such resistive layer being generally self-regulating (e.g., it includes a positive thermal coefficient material). In this manner, if heating beyond a predetermined threshold occurs, the resistance of the resistive layer increases to a point that it effectively restricts and/or prevents further electrical conduction between the electrodes. The above general teachings are further characterized by one or any combination of unique features (e.g., carrier configuration, electrode configuration, electrical connections, materials, power supply, or any of the other novel features disclosed herein) that afford any of a number of advantages relative to existing technologies.

The present teachings include: a heated seat comprising: a cushion with one or more trench areas; a heater comprising: a carrier with a periphery, the carrier further including: a first electrically functional layer that is made of a conductive material that substantially circumscribes at least a portion of the carrier; and a second electrically functional layer that is made of a resistive material; one or more electrical conductors attached to the first electrically functional layer; a trim layer that covers the cushion when the heater is placed over the cushion; and wherein the periphery includes a first side edge and a second side edge, and each side edge includes a cutout, and the cutouts are located adjacent to each other forming a neck portion; wherein the heater is attached to the cushion by placing an attachment device over the neck portion of the heater and securing one or both ends of the attachment device to the cushion so that the neck portion is pulled into the trench; wherein the neck portion is free of the second electrically functional layer; and wherein the first electrically functional layer and the second electrically functional layer form a checkered pattern.

The present teachings include: a heater comprising: a carrier, optionally including a polymeric film, that includes a plurality of cut outs about its periphery; a first electrically functional layer defining an electrode that substantially circumscribes at least a portion of the carrier; a second electrically functional layer having a resistance that differs from the first electrically functional layer; a system harness; and a controller; wherein the controller regulates the temperature of the seat by pulse width modulations and a self regulating characteristic of the second electrically functional layer.

The present teachings include: a method of making a heater comprising: obtaining a carrier; forming a plurality of cut outs along a peripheral edge of the carrier; aligning at least two cut outs so that a neck region is formed in the carrier; applying a first electrically functional layer to the carrier, wherein at least one electrode and a plurality of fingers are formed by the first electrically functional layer and optionally the electrode substantially circumscribes at least a portion of the carrier; applying a second electrically functional layer over at least a portion of the first electrically functional layer on the carrier, the second electrically functional layer having a resistance that differs from a resistance of the first electrically functional layer; and attaching at least one electrical terminal to the electrode, optionally in the absence of a mechanical connector the heater being configured so that it can be secured to a cushion with a trench and covered with a trim layer, wherein the at least two cut outs in the carrier allow the carrier to elongate, during normal use, without tearing.

In one unique aspect, the teachings herein envision the use of at least one, and more preferably two or more electrodes that are devoid of discrete ends to which power is applied. Instead, one, two, or more of the electrodes generally include at least one bus configuration that circumscribes at least a portion of the flexible carrier in a generally continuous manner, and possibly without any discretely defined ends. Preferably, the heater will include at least two generally continuous electrodes (i.e. at least one positive electrode and at least one negative electrode) that circumscribe at least a portion of the flexible carrier in a continuous manner without discretely defined ends. The heater may include fingers that extend from the at least two electrodes. The fingers may form an interdigitated pattern so that the resistive layer may touch at least two of the fingers. The resistive layer may touch a finger and an electrode of different polarity, two fingers of different polarity, two electrodes of different polarity, or a combination thereof. For example, the resistive layer may touch a positive electrode and a negative finger.

In another aspect, the teachings herein envision that the resistive layer may be equally applied across the heater (i.e. the resistive layer may have a consistent density, thickness, area, or a combination thereof across the entire area of the heater). However, it is contemplated that the density, thickness, area, or a combination thereof may be increased or decreased in regions of the heater so that the resistance in those regions is increased or decreased. For example, the resistive layer may be applied in a generally checkered pattern with alternating resistive areas and gaps (i.e. an area that does not include resistive material) between the electrodes and the fingers.

In another aspect, the teachings herein contemplate that the carrier may be made of a combination of materials that are generally lightweight, but still possess attractive durability and thermal characteristics. For example, the materials envision a laminate that includes a polymeric film onto which electrodes and/or one or more other suitable self-regulating thermal generating electrical configurations are applied to the laminate, and a fabric layer that may be applied over one or both sides of the laminate (e.g. film). The carrier may be made of polyester, polyurethane, or a combination of both. The fabric layer, the polymeric film, or both may include a resistive material as described herein.

In another aspect, the teachings herein contemplate the use of a material or a combination of materials that are generally lightweight, but still possess attractive durability and thermal characteristics. For example, it is envisioned that a laminate (i.e. a carrier) includes a polymeric film onto which electrodes, or one or more other suitable self-regulating thermal generating electrical configurations, are applied. A resistive material as described herein electrically bridges the electrodes, fingers, or both. Attached to the electrodes, the resistive material, or both will be one or more power lines. The one or more power lines may be attached to the electrodes, resistive material, or both by a bond that includes an adhesive bond, a hydrogen bond, an ionic bond, a metallurgical bond, or any combination. Attachment may be achieved via a weld (e.g. a laser weld, an ultrasonic weld, a friction weld, or any combination). It may further include a mechanical connector, or it may be free of a mechanical connector.

In one aspect, the carriers herein may be characterized as including an asymmetrical electrode pattern. That is, an axis defined from the midpoints along the top and bottom edges of the carrier will not exhibit mirror symmetry. The carrier may feature one or a plurality of peripheral lobes. One or more of the peripheral lobes may provide a location for electrical connection between the electrodes and one or more power lines. In this manner, it may be possible to physically isolate respective power lines from each other, such as by connecting individual lines to different lobes. Moreover, it is thus seen that it is possible to avoid the need to locate the line connections with the electrodes in common zones, while also avoiding the need for symmetric or opposing locations for the connector locations.

One unique aspect of the present teaching is that the electrodes may be a consistent width across the entire length of the electrode; however, the width (i.e. edge to edge of the electrode) of the electrode may vary across its length. For example, the width may be thickest at the point where the power lines attach to the electrodes and gradually narrow as they become further away from the power lines. In another example, the electrode may be thickest in the region that is placed in a trench.

Another unique aspect of the present teaching contemplates having multiple power settings that are not controlled by a multiple resistor arrangement or a multiple zone arrangement. The present teaching may use a variable duty cycle (i.e. a pulse width modulated waveform) that may be used to control the amount of power sent to the heater so that the temperature of the heater can be variably controlled. It is contemplated that regulation may occur by providing a DC power that is either fully on, cycling, or fully off together in addition to the self-regulation of a resistive layer. The temperature may be varied by changing the amount of time that the heater is fully on, fully off, or a combination thereof. It is the variation of the power supply between fully on and fully off that will provide a waveform that will give the appearance of a square wave configuration. It is contemplated that regulation may also occur by providing an AC power that is variably controlled by an electronic device (e.g. via triac, thyristors, or the like). The temperature may be varied by truncating the power sine wave to obtain the desired power level.

In yet another aspect, the seat discussed or heater disclosed herein may be assembled with a suitable spacer material (e.g., a reticulated foam, a knitted spacer fabric, a closed cell foam having apertures for air flow, rubberized hair, a spacer material that includes synthetic strands of material sandwiched between webs of honeycomb textile (one example of a preferred material is sold under the tradename 3MESH® and is commercially available from Müller Textil GmbH, Germany or Müller Textiles. Inc., Rhode Island, USA.)). Examples of spacer materials (e.g. a knitted spacer fabric) that may be used are found in U.S. Pat. No. 7,618,089 (incorporated by reference herein). Other aspects of the teachings may include one or any combination of side edge configurations for the carrier (i.e. laminate) that includes plural cutouts that project laterally inward from the side edges (e.g., cutout that are generally shaped as the capital letter "T"). A plurality of neck regions may be located between the top and the bottom edges of the carrier (e.g. a region with one or more cutouts). One or a plurality of elongated slits (i.e. external slits, internal slits, or both) may extend between the top and bottom edges of the carrier.

It is further contemplated that the present teaching may be used in conjunction with a seat that provides ventilation and/or temperature conditioning (e.g. active cooling using a Peltier-effect thermoelectric device or module for generating cooling), active heating, or a combination thereof). The conditioning system may use a plenum, a bag or other air distribution system to distribute air to the user. The heater may be placed over or under an air distributor. The heater may form a wall of the air distributor. The heater may be placed inside of the air distributor (e.g. encapsulated in a bag). By way of example, without limitation, the heaters herein may be employed in a ventilated seat, or an actively cooled seat structured consistent with the teachings of U.S. Pat. Nos. 7,478,869; 7,052,091; 6,869,139; 7,131,689; and/or United States Patent Application 2006015801; all incorporated by reference. The heaters herein may be employed in a seat in combination with a thermoelectric device that is employed for performing a cooling function.

BRIEF DESCRIPTION OF THE DRAWINGS

The features and inventive aspects of the present teaching will become more apparent upon reading the following detailed description, claims and drawings, of which the following is a brief description:

FIG. 2A-2B illustrate two possible cross sectional views of the present teachings;

FIG. 3 is a top view of another aspect of the present teaching located in a vehicle seat;

FIG. 7 illustrates another possible embodiment of the present teachings;

FIG. 10 illustrates yet another possible configuration for a carrier;

DETAILED DESCRIPTION

Figure 1:
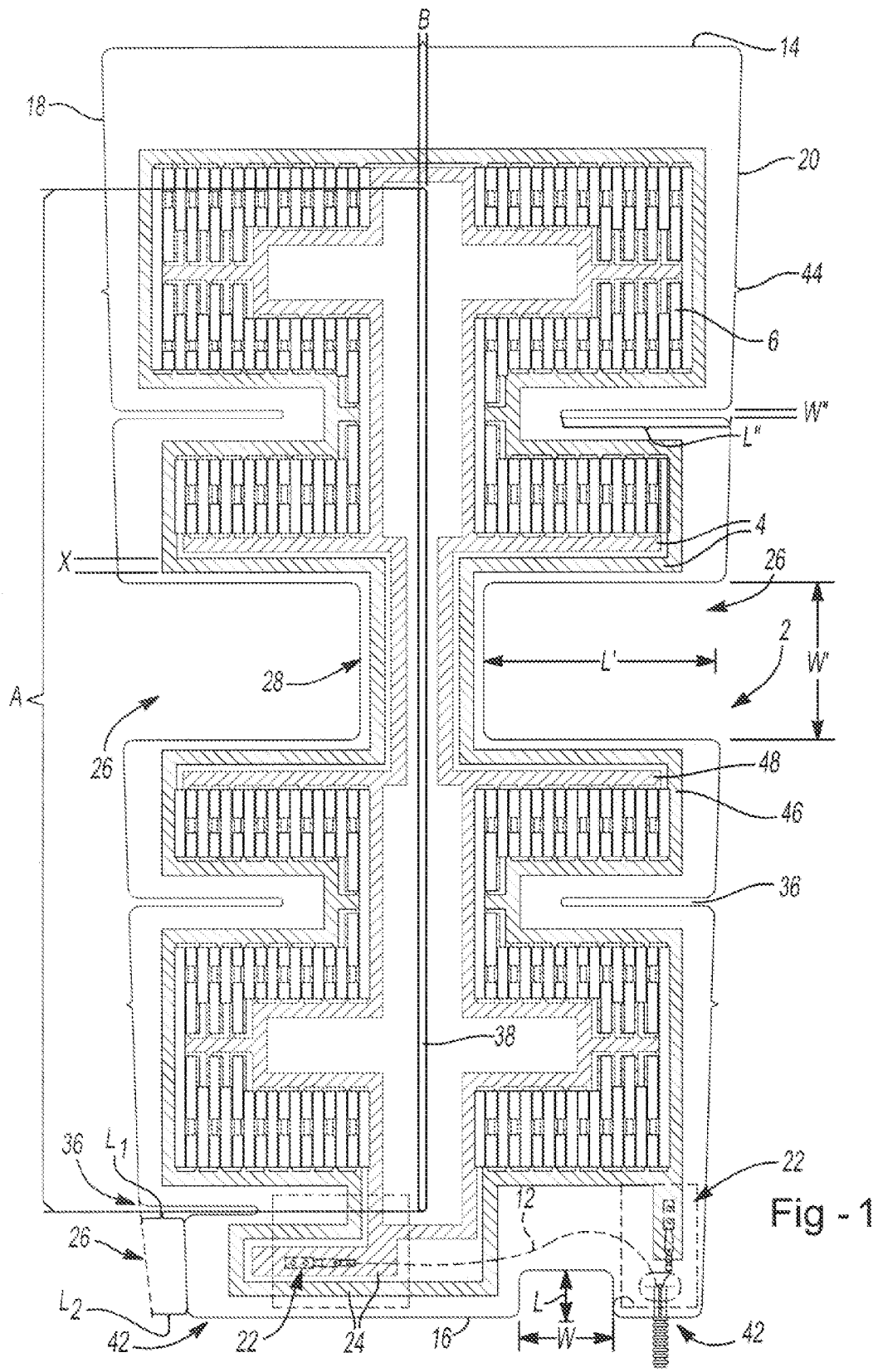
FIG. 1 is a top view of a heater in accordance with one aspect of the present teaching.

The present teachings are predicated upon providing an improved heater suitable for integration into a variety of articles of manufacture. For example, the heater may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the heater may be integrated into or attached to various components of transportation vehicles such as seats, benches, mirrors or mirror assemblies (e.g. rearview mirrors, side view mirrors or the like), gear shifters, panels, footwells, floor mats, cargo or bed liners, windows, batteries, or other components. The heater of the present teachings may be located anywhere throughout a vehicle, and most advantageously, with components that generally come in contact with an occupant of the vehicle including arm rest, rear view mirrors, user control interfaces, seats, steering wheels, or otherwise. The heater may be employed for other heating applications external of a vehicle (e.g., bedding, clothing, helmets, shoes, tool handles, growing plants, medical uses, pharmaceutical uses, or otherwise).

The heater is particularly suitable for integration into a seat of an automotive vehicle. More particularly, the heater is suitable for integration with the seat portion with or without bolsters, back portion with or without bolsters, head rest portion, or a combination thereof. The heater may be located between two layers of the seat. The heater may be located under a fabric layer (e.g. cloth, leather, synthetic leather, or the like) and on top of a cushion or backrest (e.g. a foam support for the user). In one aspect, the present teaching employs a structure that makes it particularly suited for use beneath a perforated leather seat cover or perforated synthetic leather seat cover. In this manner, the present heaters are particularly attractive for use in combination with a conditioned seat (e.g. a ventilated, actively cooled (such as by use of a thermoelectric device or module), or actively heated seat). The heater may be integrated with the seat cover by way of sewing, gluing, or other methods. The heater may be integrated with the seat foam support by way of moulding, gluing, or other attachment methods.

A conditioned seat may include one or more air movers. The one or more air movers may move air through one or more inserts that are located within or overlay the backrest cushion, seat cushion, or both. The one or more inserts may distribute the air from the air mover. The one or more air movers may include a Thermoelectric Device (TED). The TED may heat air as it enters the air mover or as it leaves the air mover. The TED may cool air as it enters the air mover or as it leaves the air mover. The air may be blown through the insert, the heater, the perforations in the seat cover (e.g. trim layer), or a combination thereof. One example of an air permeable seat and heating device is U.S. Pat. No. 6,064,037 incorporated by reference herein. The TED may blow hot air while the heater contemporaneously heats the seat; thereby, providing both conduction heating and convection heating. The heater may heat without the TED blowing heat and vice versa. It is contemplated that the cutouts, internal slits, external slits, voids, apertures, carrier configuration, or the like may be shaped similarly or be aligned with the insert, perforations in the seat cover, both, or a combination thereof. The carrier of the heater may be configured so that the carrier does not inhibit air movement.

U.S. Pat. Nos. 6,893,086; 7,370,911; and 7,478,869 (incorporated by reference herein) illustrate examples of possible seat inserts and air mover configurations. The heater described herein may be configured so that it may be used, for example, with the seating configuration disclosed in U.S. Pat. No. 7,478,869. A ventilated seat may include one or more air movers. The heater described herein may be placed so that a fluid may be moved over the heater and warm the fluid. The warmed fluid may travel within the trim bag and subsequently towards the occupant to provide comfort and/or heat. The trim bag may include one or more baffles so that a fluid passes back and forth through and/or over the heater. The heater may be centrally placed (i.e. is a center layer that fluid has to pass through and/or around) in the trim bag so that the heater acts as a baffle.

The heater as discussed herein may be used with any vehicle seat. Some vehicles may employ one or more recessed areas (also referred to herein as trenches or trench areas or a bite line) between adjoining portions of a cushioning material, such as a polymeric foam bun or an area between two or more foam buns. It is contemplated that the heater may be used with a vehicle seat with no trench areas. Preferably, the heater may be used with a seat that includes one or more trench areas. More preferably, the heaters described herein may have a portion that is designed to be placed in the trench area of a cushion so that the heater may be secured in place and performance is not sacrificed. The heater may, however, be used without entering a trench area (i.e. may fit an area of the seat so that it does not enter a trench area).

The heater may include multiple layers. The heater may include a base member, laminate, or carrier. The carrier may be made of any material suitable for receiving one or more layers. The carrier may be any material that is flexible and durable. The carrier, preferably, will be made of an insulator. The carrier may be made of an elastic material that stretches without breaking. Preferably, the carrier will be made of a material that does not permanently stretch under typical loads, but will return to its original shape upon release of the load. The carrier may be made of a memory material that plastically deforms and/or elastically deforms from a first shape but returns to the first shape upon application of a certain stimulus (e.g., heat). Even though it is preferable that the carrier does not stretch; the carrier should not be so rigid that repeated flexing would cause the carrier to crack, fail, break, or the like. For example, the carrier may be made of a polymeric material (e.g., thermoset or thermoplastic), and more specifically a thermoplastic polymeric material. The polymeric material may be selected from homopolymers, copolymers, composites, or other material combinations that include one or more of a polyester, a polyimide, polyolefin (e.g., polypropylene, polyethylene, or combination thereof), or polyetherimide. Examples of commercially available materials include one or more of Mylar®, Melinex®, Tyvek®, Cetus®, or Ultem®). The carrier material may also be a relatively rigid material, such as a ceramic (e.g., a glass). The carrier may be in the form of a film, a fabric (e.g., woven and/or unwoven), other textile, or a combination thereof. The carrier may be a dielectric. The carrier may be made of a material that is not a dielectric. It is contemplated that the layers discussed herein may be applied in any order. It is further contemplated that the layers discussed herein may be applied by the same method (e.g. all screen printed or all inkjet printed) or by different methods (e.g. one layer screen printed and another layer inkjet printed). The carrier preferably includes a polymeric film. However, it may be a textile (e.g., a woven textile, an unwoven textile, paper, or a combination thereof). The carrier may be a sheet form or a shaped form (e.g., a molded part, an extruded profile, a thermoformed part, or any combination). The thickness of the carrier (e.g., if it is a film or sheet of fabric) may be about 5 mm or less, about 2 mm or less, about 1 mm or less, about 0.5 mm or less, about 0.3 mm or less. The thickness of the carrier (e.g., if it is a film or sheet of fabric) may be about 0.05 mm or more, about 0.1 mm or more, about 0.2 mm or more.

The carrier may be any shape suitable for heating and receiving electrically functional layers thereon for producing heat. The carrier may include one or more edges. The carrier may be circular (i.e. one peripheral edge), crescent shaped (i.e. two peripheral edges), triangular (i.e. three peripheral edges), square or rectangular (i.e. four peripheral edges), pentagon shaped (i.e. five peripheral edges). The carrier may have more than five, six, seven, eight, nine, or even ten peripheral edges. The peripheral edges may have rotational symmetry. The peripheral edges may not have rotational symmetry.

The carrier may include one or more tabs. The carrier may include about 2 or more tabs, about 5 or more tabs, about 7 or more tabs, or even about 10 or more tabs. The carrier may be free of tabs. The tabs may be integrally formed with the carrier. The tabs may be formed by removing excess material from the carrier after the carrier is created. The tabs may be located on any interior edge, any exterior edge, cut out, internal slit, external slit, or a combination thereof. The tabs may be an absence of material that projects inward into the carrier. The tabs may include one or more points. The tabs may be a backwards triangle shape where the one point faces into the carrier and the other two points project outward. It is contemplated that the tab may be diamond in shape and have one point in contact with the carrier and three points projecting outward from the edge of the carrier. Preferably, the tabs may project outward from the edge that they are attached. The tabs may project from an edge about 1 mm or more, about 2 mm or more, or even about 3 mm or more. The tabs may be of any size and shape (e.g. square, rectangular, triangular, a half circle, a half oval, or a combination thereof). The tabs may be symmetrically located on the edges of the carrier (i.e. an axis defined from the midpoints along the top and bottom edges and/or side edges of the carrier and may exhibit mirror symmetry). However, the tabs may not be symmetrically located on the carrier. Preferably, the tabs are located on the carrier so that the tabs align with at least one trench or marking on foam for assembly. However, the tabs may not align with a trench or a marking on the foam. The tabs may be located within and/or adjacent to one or more of the cut outs. Preferably, the tabs will align with marks on the cushions so that the heaters can be placed on the seat uniformly and consistently from seat to seat so that the heater may be located on the cushion in a location that will minimize potential damage to the heater. The tabs may permanently or temporarily hold the heater in place. The tabs may be pushed into the seat and may fixedly secure, temporarily secure, removably secure, or a combination thereof the heater to the seat. Preferably, the tabs may assist the user in placing the heater on the seat and may at least temporarily assist in holding the heater in place while further securing occurs.

The carrier may include one or more electrically functional layers. The one or more electrically functional layers may be placed on the carrier in a corresponding fashion with the one or more features of the carrier (i.e. cutouts, internal slits, external slits, voids, apertures, carrier configuration, or the like may be shaped similarly or be aligned with the insert, perforations in the seat cover, both, or a combination thereof). One or more of the electrically functional layers may substantially surround one or more features of the carrier discussed herein. In one example an electrode may conform to the shape of a feature. In a more specific example, a positive electrode may conform to the shape of an external slit, internal slit, or both. The carrier as described herein may be free of any features being surrounded by smaller electrically functional layers (i.e. traces) that are connected to and extend off of an electrode.

The one or more electrically functional layers may be placed on the carrier. For example, the one or more electrically functional layers may be placed on the carrier using an adhesive, a printing process (e.g. screen printing, offset or lithography, inkjet, laser, rotogravure, or the like), thermal transfer, engraving, spraying, rolling, dabbing, brushing, pouring, gluing, etching, electrostatic deposit, or the like. The electrically functional layers may be of one uniform thickness. The electrically functional layers' thickness may vary from one end to the other end. The electrically functional layers may be thicker (i.e. vertical height off of the carrier) in one location versus another location (e.g. a layer may be thicker where an electrode is formed). The electrically functional layers may be an even thickness across the entire carrier. The electrically functional layers may each have a thickness between about 0.001 microns to about 100 microns, between about 0.1 microns to about 75 microns, between about 1 microns to about 50 microns (e.g. about 2 microns to about 25 microns or about 5 microns to about 15 microns). The electrically functional layers may each have a varying thickness across the entire carrier. The electrically functional layers may have a width. The width of the electrically function layers may be substantially constant across the length of the electrically function layers. The width of the electrically functional layers may vary across the length of the electrically functional layers. For example, the electrically functional layers may decrease and/or increase in width as the electrically functional layer is further from the power supply lines. The electrically functional layers may have one width at a location closest to the electrical conductor of between about 25 mm and about 0.05 mm, between about 15 mm and about 0.1 mm, between about 10 mm and about 0.5 mm, or even between about 7 mm and about 1 mm. The electrically functional layer may have a width at an end farthest from the electrical conductor of between about 12 mm and about 3 mm or between about 8 mm and about 4 mm, and a width on the opposing end of between about 11 mm to about 2 mm or between about 7 mm and about 5 mm. In one embodiment, it is possible that the width of the electrically layers may decrease in the neck portion only. (i.e. the electrodes will be the same size on the sides opposing the neck). It is contemplated that the area (i.e. width, thickness, density, or a combination thereof) of the one or more electrically functional layers may vary based on a calculated maximum voltage drop across the electrically functional layer. The area may be the cross-sectional area of one or more of the electrically functional layers. The area may be a surface area of the one or more electrically functional layers.

The width of the electrically functional layer may vary across the length of the carrier. The width of the electrically functional layer may gradually decrease as the electrically functional layer becomes more distant from the power supply lines. For example, the width of the electrically functional layer may be 8 mm at the power supply lines and 4 mm at the point most distant from the power supply lines.

Preferably, the width of the electrically functional layers may decrease across their length except where the electrically functional layers enter into the trench; the width of the electrically functional layers may increase. For example, the width of the electrically functional layer may be 8 mm at the power supply lines, 4 mm at the point most distant from the power supply lines, and 10 mm in the region that enters the trench. Preferably, the width of the electrically functional layer may be greatest, when compared across the length, at the region that enters the trench or the neck portion. The width of the electrically functional layers may remain constant throughout the entire length of the electrically functional layer except for the portion of the electrically functional layer in the trench region, which may increase in width. The width of the electrically functional layer may be equal to the width of the electrically functional layer at the power supply lines. The electrically functional layer may have a ratio of the width of the electrically functional layer at the power supply lines to the width of the electrically functional layer at the trench region. The ratio of the width at the power supply line to the width at the trench region may be about 1.5:1 or less about 1.3:1 or less or about 1.2:1 or less or about 1.1:1 or less, or about 1:1 or less. The ratio of the width at the power supply line to the width the trench region may be about 1:5 or less, about 1:4 or less, about 1:3 or less, about 1:2 or less, about 1:1.5 or less, about 1:1.3 or less, or about 1:1.2 or less. The width of the electrically functional layer may gradually decrease until the electrically functional layer approaches the trench region and then the width may rapidly increase to a new width (i.e. trench width) and then once the trench region ends gradually reduce again. For example, the width of the electrically functional layer may continuously decrease up to a trench and then the width of the electrically functional layer increases in the trench region and then after the trench region the electrically functional layer decreases again. This example may repeat if the heater includes multiple trenches. The width of the electrically functional layer in the trench region may be about 1 mm or more, about 2 mm or more, about 4 mm or more, about 6 mm or more, or about 8 mm or more. The width of the electrically functional layer may be about 20 mm or less, about 15 mm or less, about 12 mm or less, or about 10 mm or less. The width of the electrically functional layer may decrease by about 5 percent or more per 10 cm, about 5 percent or more per 5 cm, about 5 percent or more per cm. The width of the electrically functional layer may decrease by about 10 percent or less per cm, about 10 percent or less per 5 cm, or about 10 percent or less per 10 cm.

The width of the electrically functional layer may make step changes in width. The width may remain constant and then at a given point the width may be reduced by about 10 percent, about 20 percent, about 30 percent, or more. The width of the electrically functional layer may reduce by between about 20 percent and 60 percent at a given step. For example, the width of half of the electrically functional layer may be about 10 mm wide from the power supply lines (i.e. wire harness or wire terminal) to the middle of the heater and then the second half may have a width of about 5 mm until the end of the heater. The electrically functional layer may include enough steps so that the performance of the electrically functional layer is not adversely effected and the heater heats. The heater may include one or more steps. The heater may include a plurality of steps. The heater may include about 1 step or more, about 2 steps or more, or about 3 steps or more. The heater may include about 10 steps or less, about 8 steps or less, about 6 steps or less, or about 4 steps or less.

Preferably, when a step change is used to change the width of the electrically functional layers the width of the electrically functional layers in the trench region remain constant.

The electrically functional layer has a width near the power supply lines and a width at a location distant to the power supply lines. The electrically functional layer may include a width in the trench region (i.e. the portion of the heater that enters the trench and/or the neck portion).

The heater may include a first electrically functional layer on the carrier. The first electrically functional layer may include a conductive material. The first electrically functional layer may include a resistive material (e.g., a positive thermal coefficient material). Preferably, the first electrically functional layer will be a conductive material. The conductive material may be any material capable of conducting electricity. The conductive materials may include silver, copper, gold, graphite fibers, carbon fibers, or a combination thereof. The conductive material may be employed as a dispersion of conductive particles within the electrically functional layer (e.g., as a conductive ink). The conductive particles may include particles of a first conductive material. The conductive particles may include particles of a first conductive material coated with a second conductive material (e.g., copper particles coated with silver).

The first electrically functional layer may have one or more discrete structures (e.g. buss or electrode). Preferably, the first electrically functional layer will form at least two discrete structures (i.e. a positive electrode and a negative electrode). The size, shape, pattern, design, number of electrodes, or a combination thereof of the first electrically functional layers may be any of the embodiments described herein.

Because of the wear conditions to which the layers will be subjected (especially for seating applications), any of the electrically functional layers herein desirably will exhibit an abrasion resistance (pencil hardness), as measured by ASTM D3363-74 with a minimum of at least about 3B, preferably at least about 5B. More preferably, the electrically functional layers will exhibit an abrasion resistance of more than about 3H, or even about 5H. However, desirably, electrical performance will not be compromised as a result of abrasion resistance. The electrically functional layers may be such that it allows soldering or the formation of a metallurgical bond between materials, such as for joining an electrical conductor (i.e. a power line, a coated copper wire, or the like).

One or more of the electrically functional layers will typically be provided as a dispersion of conductive particles (e.g., including one or more metallic particles (such as copper, silver, gold, platinum), carbon, or any combination thereof). They may be a fired high solids material. They may be a polymer thick film. The conductive particles may be in combination with a polymeric or other film forming binder material so that upon application in a liquid state, a liquid phase will evaporate to leave a cohesive film. A silver-containing ink may be employed as an electrically functional layer. One particularly preferred material for use as part of an electrically functional layer is a copper ink. A suitable ink may have a sheet resistivity of between about 5 mΩ/sq to about 200 mΩ/sq, between about 10 mΩ/sq to about 100 mΩ/sq, between about 20 mΩ/sq to about 75 mΩ/sq (i.e. between about 20 nm/sq to about 30 mΩ/sq or between about 65 mΩ/sq to about 75 mΩ/sq) at 25 microns of thickness. A suitable ink may have a high resistance to material transfer (i.e. does not transfer material) as measured by Adhesion/Tape Pull (3M Scotch Tape #600)). The ink may have excellent solderability. For example, the ink may solder 100 percent with a eutectic or other solder and a mildly activated flux. However, the ink may solder less than 100 percent and be used as a conductor on the carrier.

A suitable ink may not have any significant changes in electrical properties after being subjected to different environmental testing conditions. The ink may exhibit characteristics shown by one or more of the following environmental tests, and preferably all of the environmental tests. The ink may have a thermal aging with a change in resistivity of less than about 50 percent, less than about 40 percent, or even less than about 30 percent when aged at 85 degrees Celsius for 2000 hours. The ink may have a change in resistivity of less than about 50 percent, less than about 45 percent, less than about 40 percent, or even less than about 30 percent when subjected to heat and humidity testing conditions of 60 degrees Celsius, with a relative humidity of 95 percent for 3000 hours. The ink may have a change in resistivity of less than about 40 percent, less than about 30 percent, or less than about 20 percent when subjected to thermo cycling testing conditions of −55 degrees Celsius to 125 degrees Celsius for 500 Cycles. The ink may have a change in resistivity of about 15 percent or less, about 10 percent or less, or even about 5 percent or less when subjected to solder dip testing conditions of 260 degrees Celsius for 10 seconds and for 3 cycles. The ink may have a change in resistivity of about 15 percent or less, about 10 percent or less, or even about 5 percent or less (i.e. about 4 percent) when subjected to pressure cooker testing conditions of 121 degrees Celsius at 100 percent relative humidity and 2 atm for 8 hours. The ink may have a change in resistivity of about 40 percent or less, about 30 percent or less, or even about 25 percent or less when subjected to pressure cooker testing conditions of 121 degrees Celsius at 100 percent relative humidity and 2 atm for 24 hours.

A suitable ink may have a viscosity between about 10 Pa·S to about 150 Pa·S, between about 30 Pa·S to about 100 Pa·S, and between about 65 Pa·S to about 85 Pa·S (e.g. between about 65 Pa·S and about 75 Pa·S or between about 75 Pa·S and about 85 Pa·S) when tested using a Brooksfield RVT, with a #7 spindle and UC at 10 rpm at 25 degrees Celsius. The ink may have a coverage property of between about 25 cm$^2$/g to about 300 cm$^2$/g, between about 50 cm$^2$/g to about 200 cm$^2$/g, and between about 100 cm$^2$/g to about 140 cm$^2$/g (e.g. about 100 cm$^2$/g to about 120 cm$^2$/g). Examples of commercially available copper inks that may be used are CB200 copper conductor and CB230 Copper Conductor available from DuPont. An example of a commercially available silver ink that may be used is a family of 5000 series from DuPont. More particularly, a 5064 silver ink available from DuPont.

It is further contemplated that the ink used may be a nanoink (i.e. an engineered nanoparticle dispersed in a liquid vehicle). The nanoparticle may be made of silver, copper, gold, graphite, carbon, or the like. A nanoink may be applied to the carrier in any of the methods discussed herein. Preferably, a nanoink may be applied using an inkjet printer (i.e. a piezoelectric inkjet printer). It is contemplated that the user can input an electrode configuration into the computer and in substantially real time print the electrode configuration. The nanoink may be applied at a low temperature. The nanoink may be applied at a temperature of about 200 degrees Celsius or less, about 150 degrees Celsius or less, or about 125 degrees Celsius or less (i.e. less than about 100 degrees Celsius). The nanoink may cure in about 120 minutes or less, about 60 minutes or less, about 45 minutes or less (i.e. between about 30 minutes and 1 minute). The nanoink may cure at a temperature of between about 10 degrees Celsius to about 500 degrees Celsius, between about 25 degrees Celsius to about 450 degrees Celsius, between about 50 degrees Celsius to about 400 degrees Celsius (i.e. between about 100 degrees Celsius to about 350 degrees Celsius).

The use of a nanoink may allow the user to print on a carrier without making a screen or without using a screen to form the electrodes, traces, fingers, branches, electrically conductive layers, or a combination thereof. The printing process may be free of a screen. The nanoink may be water based, solvent based (i.e. alcohol), or the like. A suitable nanoink may exhibit good flexibility when printed on a flexible substrate. The nanoink may also be printed on a rigid medium.

Nanoinks may be printed as a thinner layer than conventional inks. Nanoinks may have a thickness of about 5.0 mm or less, about 2.0 microns or less, about 0.1 microns or less, or even about 0.02 microns or less (i.e. between about 1.5 microns and 0.2 microns in thickness).

One particularly preferred material for use as part of an electrically functional layer is a nanoink. A suitable nanoink may have a sheet resistivity of between about 5 mΩ/sq to about 2000 mΩ/sq, between about 20 mΩ/sq to about 1500 mΩ/sq, between about 50 mΩ/sq to about 1200 mΩ/sq (i.e. between about 75 mΩ/sq to about 1000 mΩ/sq) at 0.4 microns of thickness. A suitable nanoink may have a bulk resistivity of between about 1 mΩ*cm to about 200 mΩ*cm, between about 2 mΩ*cm to about 150 mΩ*cm, between about 3 mΩ*cm to about 100 mΩ*cm (i.e. between about 4 mΩ*cm to about 80 mΩ*cm). A suitable nanoink may have a surface tension at 25 degrees Celsius of between about 10 mN/m to about 100 mN/m, between about 20 mN/m to about 75 mN/m, between about 25 mN/m to about 50 mN/m (i.e. between about 31 mN/m to about 33 mN/m). A suitable nanoink may have a density of between about 0.5 g/ml to about 5.0 g/ml, between about 1.0 g/ml to about 3.0 g/ml, between about 1.1 g/ml to about 2.0 g·ml (i.e. about 1.23 g/ml to about 1.24 g/ml). A suitable nanoink may have a fired print thickness at 500 dots per inch (dpi) of between about 0.01 μm to about 5.0 μm, between about 0.1 μm to about 2.0 μm, between about 0.2 μm to about 1.0 μm (i.e. between about 0.3 μm to about 0.5 μm).

A suitable nanoink may have a viscosity between about 5 cP to about 100 cP between about 7 cP to about 50 cP, or between about 10 cP to about 20 cP (e.g. between about 11 cP to about 15 cP) when tested at 22 degrees Celsius. The nanoink may have a silver solid loading property of between about 5 weight percent to about 100 weight percent, between about 10 weight percent to about 50 weight percent, and between about 15 weight percent to about 30 weight percent (e.g. about 19 weight percent to about 21 weight percent). An example of a commercially available nanoink that may be used is CCI-300 available from Cabot.

The heater includes a second electrically functional layer. The heater may include a second electrically functional layer on the carrier. The second electrically functional layer may be applied over or beneath a portion of the first electrically functional layer. The second electrically functional layer may completely cover the first electrically functional layer. The second electrically functional layer may partially overlap with the first electrically functional layer. Preferably, the second electrically functional layer will be applied over a majority of the first electrically functional layer and the carrier (e.g. the second electrically functional layer will touch a positive section of the first electrically conductive layer, a negative section of the first electrically conductive layer, a section of the carrier, all three, or a combination thereof). The second electrically functional layer may be a conductive material or a resistive material. Preferably, the second electrically functional layer will be a resistive material. The second electrically functional layer may be a positive temperature coefficient material. The second electrically functional layer material (e.g., a conductive or a resistive material) may be provided in a form similar to that of the first electrically functional layer. It may be made of a co-polymer binder mixed with carbon particles (e.g. natural carbon, petroleum carbon, carbon flakes, graphite, or the like), additives (e.g. anti-foaming, anti-floth, adhesive, fire retardant, or the like), fillers (e.g., day, titanium dioxide, or the like), solvents (e.g. alcohol based, ethanol based, or the like), or a combination thereof. Preferably, the second electrically functional layer may be made of PTC ink, for example, DuPont 7282 family of inks. The first electrically functional layer and second electrically functional layer may be applied in such a manner that they form an electrode structure (e.g. a buss structure) that is electrically bridged by the resistive material. Preferably, the first electrically conductive layer will form two or more discrete electrode structures. The positive electrode may be on the inside of the carrier. Preferably, the positive electrode may be on the outside edge of the carrier. The negative electrode may be on the outside edge of the carrier. Preferably, the negative electrode may be on the inside of the carrier. Preferably, the second electrically conductive layer will form a bridge contacting the positive electrode and the negative electrode. More preferably, the second electrically layer may be applied in a generally checkered pattern, with alternating resistive areas and gaps (i.e. an area that does not include the second electrically functional layer) between the electrodes and the fingers. The second electrically conductive layer may contact the carrier between the positive electrode and the negative electrode. The second electrically conductive layer may be free of contact with the carrier (i.e. the second electrically conductive layer may only contact the first electrically conductive layer and there may be an air gap between the second electrically conductive layer and the carrier).

One particularly preferred material for use as part of an electrically functional layer is a positive temperature coefficient carbon resistor. A suitable positive temperature coefficient material may have a sheet resistivity of between about 1 K$\Omega$/sq to about 100 K$\Omega$/sq, between about 5 K$\Omega$/sq to about 50 K$\Omega$/sq, between about 10 K$\Omega$/sq to about 25 K$\Omega$/sq (i.e. about 12 K$\Omega$/sq to about 15 K$\Omega$/sq) at about 7 to 10 microns of thickness. A suitable positive temperature coefficient material may have a temperature coefficient of resistance (TCR) between 25 and 125 degree Celsius of about 10,000 ppm/° C. or greater, about 15,000 ppm/° C. or greater, or about 20,000 ppm/° C. or greater (i.e. greater than about 25,000 ppm/° C.). A suitable positive temperature coefficient material may have a high resistance to material transfer (i.e. does not transfer material) as measured by Adhesion/Tape Pull (3M Scotch Tape #600)). A suitable positive temperature coefficient material may have a viscosity between about 5 Pa·S to about 150 Pa·S, between about 10 Pa·S to about 100 Pa·S, and between about 13 Pa·S to about 85 Pa·S (e.g. between about 15 Pa·S and about 70 Pa·S) when tested using a Brooksfield RVT, with a #7 spindle and UC at 10 rpm at 25 degrees Celsius.

An electrical terminal may attach to the one or more electrodes. The attachment location of the electrical terminal may be anywhere on the electrode. The one or more electrode may be formed so that it includes a continuous circumscribing band structure, which may be free of any defined ends. The electrode may not be a continuous band and may include defined ends. The electrode may include junctions, connectors, crossing paths, intersections, or a combination thereof. The electrode may be free of any interruptions and will be continuous. The electrode may be free of junctions, connectors, crossing paths, intersections, or a combination thereof. Advantageously, such a structure permits for the ready adaptation of a heater for use in multiple different seats, each having its own geometric and installation constraints. The heater thus can be used as a generally universal platform, adaptable to a wide range of different seats without modification to the electrode geometry. The electrodes may form a continuous band that extends around any of the features of the carrier so that the electrode remains unbroken. The positive electrode may fully or partially circumscribe some or all of the features on the outside edge and/or inside of the carrier. The negative electrode may fully or partially circumscribe some or all of the features on the inside and/or outside edge of the carrier. For example, the positive electrode and/or negative electrode may follow the shape of an outside edge of the carrier and then follow the shape of an external slit as the external slit extends into the carrier, and then follow the shape of the external slit back to the outside edge.

The heater may include one or more third layer on the carrier. The third layer may be located on top of the electrically functional layers, on a side of the carrier opposite the electrically functional layers, or both. In contrast with the first electrically functional layer and the second electrically functional layer, the third layer is generally a protective layer, and may be have dielectric characteristics. The third layer may be applied over the entire area of the carrier, or only a portion of it. The third layer may be applied over both the first electrically functional layer and the second electrically functional layer. The third layer may attach to the fourth layer. The third layer may be free of attachment to a fourth layer. The third layer may attach to the fifth layer. The third layer may be a double coated film (i.e. have an adhesive on both sides of a carrier and one side of adhesive is covered by a removable backing material). The third layer may have adhesive on only one side. Preferably, the third layer has adhesive on at least one side. The third layer may protect the first electrically functional layer and the second electrically functional layer from environmental conditions (e.g. dirt, liquids, or other common items found in a vehicle). Preferably, the protective third layer may be selected to resist moisture and humidity. Thus, the third layer may be moisture impermeable. The protective third layer may also conform well to curved surfaces so that the curved surfaces can be protected. The third layer may be a film, a foil, a textile, a coating, a sheet, or any combination. The third layer may be at least partially transparent, it may be at least partially opaque, it may be completely opaque, or a combination thereof. The third layer may have a thickness of about 100 microns or less, 75 microns or less, 60 microns or less (i.e. between about 50 microns to about 25 microns in thickness). The third layer may be made of a polymeric film (e.g. polyester or polyurethane) that may be coated or uncoated on one side or both sides with an acrylic adhesive. The third layer may be glued, laminated, taped (i.e. heat laminated) unto the carrier. Preferably, the third layer will be made of ARClad 8350, produced by Adhesive Research.

The heater may include one or more fourth layer. The fourth layer may cover a portion and/or all of the carrier, the first electrically conductive layer, the second electrically layer, the third layer, or a combination thereof. The heater may be free of a fourth layer. The heater may include a fourth layer when the third layer is a single sided adhesive layer. The fourth layer may be an adhesive layer (e.g. a glue, paste, spray on adhesive, an adhesive film, a peel and stick, hook and loop, or the like). Preferably, the fourth layer may be a peel and stick film. The fourth layer may be used to attach a fifth layer to the carrier. The fourth layer may attach the carrier directly to the underside of the trim layer (i.e. the carrier may be glued onto the trim layer) so that a fifth layer is not necessary. The fourth layer may attach the heater directly to a cushion. The fourth layer may be applied to either side of the carrier or both sides of the carrier. The fourth layer may be applied to the carrier over any other layer discussed herein and adhere the carrier to a cushion. For example, once the heater is formed the fourth layer may be applied to the heater and then attached to the cushion. The fourth layer may be an adhesive layer that is applied between any other layers.

The heater may include one or more fifth layer on the carrier. The fifth layer may be on top of the electrically functional layers, on a side of the carrier opposite the electrically functional layers, or both. Preferably, the fifth layer covers at least the non-printed side of the carrier. In contrast with the first electrically functional layer and the second electrically functional layer, the fifth layer is generally a protective layer, and may be have dielectric characteristics. Generally, if a fifth layer is used it is attached to the carrier by a fourth layer. Optionally, if a third layer is used the fifth layer may cover the third layer and the third layer may attach the fifth layer to the carrier. If a third layer is not used then the fifth layer may directly cover the first electrically functional layer, the second electrically functional layer, or both. A fourth layer may be used to attach a fifth layer when a third layer is used that includes only a single side of adhesive. Preferably, the fifth layer will cover the entire area of the carrier. The fifth layer may cover only a portion of the other layers. At least a portion of the third layer, fourth layer, the fifth layer, all three, or a combination thereof may cover only the electrodes and electrical connections. The fifth layer may sandwich the carrier and any layers disposed on the carrier. The use of the fifth layer to form a sandwich is optional. The fifth layer may be made of any material suitable for covering the carrier. Preferably, the fifth layer may be made of a low density fabric. The fifth layer may have a bulk density that is about $0.6$ g/cm$^3$ or less, about $0.4$ g/cm$^3$ or less, about $0.2$ g/cm$^3$ or less, or even about $0.10$ g/cm$^3$ or less (i.e. about $0.15$ g/cm$^3$ to about $0.04$ g/cm$^3$). The fifth layer may be a film, a foil, a textile, a coating, a sheet, or any combination. The fifth layer may be at least partially transparent, it may be at least partially opaque, or both. Preferably, the fifth layer will be substantially opaque. For example, the fifth layer may be made of a woven or unwoven material such as polyester, fleece, polypropylene, rayon, nylon, wool, linen, cotton, any combination thereof, or the like. The fifth layer may be a breathable or non-breathable material. Preferably, the fifth layer is a breathable polyester. The fifth layer may be applied to any side of the carrier. The fifth layer may be attached to the printed side of the carrier. Preferably, the fifth layer is attached to the non-printed side of the carrier. Preferably, if a fifth layer is used the fifth layer will be applied to at least the side of the carrier that faces the top of the cushion (i.e. screen printed side).

The heater may contain features that allow air to pass through the heater. These features may be any heater configuration that allows air to pass through the heater. These features may be a cutout, an external sit, an internal slit, voids, apertures, carrier configuration, circular hole, the like, or a combination thereof. The heater as discussed herein may include one feature. The heater may include a plurality of features. Preferably, the heater may include between about 4 and 20 features, more preferably between about 6 and 16 features, and most preferably between about 8 and 12 features. These features may be included only in the carrier. For example, the carrier may include a feature and the carrier may be the only layer to include the feature (i.e. the third layer, the fourth layer, the fifth layer, or a combination thereof may be free of a feature). These features may be through every layer. For example, the carrier, first layer, second layer, third layer, fourth layer, and fifth layer may each include matching features so that they overlap and allow air to pass through. Preferably, combinations of the layers include one or more feature. For example, the carrier and the fourth layer may include an overlapping feature and the fifth layer may be free of a feature. In another example, the carrier, third layer, and the fourth layer may include overlapping features and the fifth layer may be free of features. A feature may be located in the carrier, the first layer, the second layer, the third layer, the fourth layer, the fifth layer, the sixth layer, or a combination thereof. Preferably, the layer that is free of a feature will be breathable at least in the region adjacent to the feature in the other layers. A feature may be a hole in one or more layer (i.e. completely internal). A feature may be an internal slit or an external slit that includes an enlarged portion. For example, one possible feature may be a slit with a circular hole at the end so that air may pass primarily through the hole but also through the slit leading to the hole from an edge. The heater may include one or more features when seating system does not include a fan, blower, air mover, thermoelectric device, peltier device, or a combination thereof. Preferably, the heater includes one or more features when the heater is used in conjunction with a fan, blower, air mover, thermoelectric device, peltier device, or a combination thereof to heat and/or cool a vehicle seat.

The heater may be covered by a trim layer (i.e. a sixth layer). The trim layer may cover the first electrically functional layer, second electrically functional layer, third layer, fourth layer, fifth layer, or a combination thereof. The trim layer may include multiple internal layers. The trim layer may include a top layer made of cloth, leather, synthetic leather, vinyl, or the like. The trim layer may include a plus pad or a plush pad (which is a padding that may be made of foam, sponge polyester, woven or non-woven batting, reticulated foam, the same material as the spacer layer, or a combination thereof and attached to the trim layer), a scrim layer, a foam layer, or a combination thereof. The heater may be located under all of the layers of the trim layer. The heater may be located between layers of the trim layer (i.e. between the top layer and the plush pad, scrim layer, a foam layer, or a combination thereof). The heater may be glued and/or taped to one or more layers of the trim layer (i.e. glued to the top layer, plush pad, scrim layer, a foam layer, or a combination thereof). In one aspect, the trim layer may be perforated, so that air can pass through it by using an air mover in the seat. As will be appreciated, in such instances, preferably the heater will have a configuration that allows air to pass through it, whether from perforations, slits, cut-outs, apertures, or other openings. Preferably, the heater is located on top of a cushion (i.e. foam bun) and in front of a backrest cushion (i.e. back bun). Preferably, the cushion is covered by the trim layer so that the heater is hidden from view.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The one or more air movers may include a heating device, a cooling device, or both (i.e. a thermoelectric device (TED)). The TED may be used to heat air and/or cool air that is blown onto the user. The air mover and TED may be placed in the seat in many different configurations. For example, the TED and/or air mover may be used in any manner described in any of U.S. Pat. Nos. RE38,128; 4,923,248; 5,626,021; 6,164,719; 6,439,658; 6,619,736; 6,629,724; 6,676,207; 6,840,576; 6,857,697; 6,869,139; 6,869,140; 6,976,734; 7,040,710; 7,083,227; 7,100,978; 7,213,876; 7,301,441; 7,338,117; 7,356,912; 7,475,938; 7,506,938; 7,510,239; 7,587,901; 7,618,089; and 7,637,569 or U.S. Patent Application Publication No. 2009-0218855. The heater may be positioned on the one or more cushions so that the heater does not restrict fluid movement from the blower. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user.

The carrier may be attached to one or more electrical conductors (i.e. a copper wire coated by an insulating material). Preferably, at least two electrical conductors may be attached to the carrier. It is contemplated that three, four, five, six, seven, eight, nine, ten, or more electrical conductors may be attached to the carrier. Preferably, the electrical conductor attaches to the carrier via the electrical terminal and forms a terminal. Preferably the electrical terminal may include a backing plate, and/or an attachment portion. The electrical terminal may be free of a backing plate. The electrical conductor may be attached to the carrier by any method that will allow electrical current to pass through the electrical conductor to the first electrically functional layer, second electrically functional layer, or both. For example, the electrical conductor may be attached by rivet, solder, weld (e.g. ultrasonic, laser, or the like) conductive glue or adhesive, the like, or a combination thereof. The electrical conductor may be attached to the carrier so that a bond is used in addition to any mechanical fastening or in lieu of a mechanical fastener. For example, the bond may be a chemical bond, a metallurgical bond, or both. The attachment may be accomplished by welding, such as by ultrasonic welding, laser welding, or both. Some examples of ultrasonic welders that are currently available are made by Stapla Ultrasonics Corporation or Dukane Company.

Ultrasonic welding may be performed at a low enough temperature so that the carrier is not damaged. Ultrasonic welding may be performed without the addition of an external heat source (i.e. the only heat created is from the pressure and vibration of the ultrasonic welder). Thus, the base material may be heated (i.e. warmed), but not to a high enough temperature that the physical properties of the carrier are changed (e.g. melted, warped, damaged, or the like). Ultrasonic welding may be directed to a precise location so that the carrier is not damaged and only the electrical conductor and the first electrically functional layer, second electrically functional layer, or both are welded (i.e. melted, fused, bonded, or the like). The depth of the weld may be controlled by adjusting the amount of pressure applied to the electrical conductor and the carrier by the nest (i.e. anvil) and the sonotrode (i.e. horn). A pressure from about 6,000 N/m² to about 350,000 N/m² may be applied. Preferably, a pressure from about 13,000 N/m² to about 170,000 N/m² may be applied. More preferably, a pressure from about 20,000 N/m² to about 35,000 N/m² may be applied. The sonotrode may be used in a normal relationship (i.e. perpendicular) with the nest. The sonotrode may be used in a substantially parallel relationship with the nest. The relationship of the sonotrode and the nest may control the direction of the ultrasonic oscillation, and the depth of the weld. For example, when the sonotrode and anvil may be generally parallel to each other the ultrasonic oscillations will be along the same plane (i.e. a vertical oscillation). The sonotrode and anvil are normal in relation to each other and the ultrasonic oscillations may be parallel with the sonotrode and perpendicular to the nest (i.e. horizontal oscillation).

The depth of the weld may also be controlled by adjusting frequency. A frequency between about 5 kHz to about 150 kHz may be used to attach the electrical conductor to the carrier. Preferably, a frequency between about 15 kHz to about 70 kHz may be used to attach the electrical conductor to the carrier. More preferably, a frequency between about 20 kHz to about 40 kHz may be used to attach the electrical conductor to the carrier. Preferably, when ultrasonic welding is used only the first electrically functional layer, the second electrically functional layer, or both are transformed (e.g. welded, melted, fused, bonded, the like, or a combination thereof). Preferably, when ultrasonic welding is used the first electrically functional layer, second electrically functional layer, electrical conductor, or a combination thereof is made of copper or copper ink. However, ultrasonic welding may still be used to join the electrical conductor to the first electrically functional layer, second electrically functional layer, or both when other metallic materials are used (i.e. dissimilar materials are used (e.g. copper and silver)). The ultrasonic techniques discussed herein may be used to weld plastic materials together. For example, the heater may be ultrasonically welded to a bag for use with the conditioning system discussed herein or the walls, the bag may be ultrasonically welded together, or may be used to ultrasonically weld the heater to another article of manufacture. This may be achieved by using the techniques described herein to adjust the depth, heat, frequency, pressure, or a combination thereof to bond the heater to the bag, article of manufacture, or both.

The carrier and the electrical conductor may be connected using laser welding. A laser may be used to precisely melt the electrical conductor without damaging the carrier so that the electrical conductor is attached to the first electrically functional layer, the second electrically functional layer, or both without damaging the carrier. This may be accomplished by controlling the energy level of the laser beam so that the laser only treats the surface of the carrier (i.e. the first electrically functional layer, second electrically functional layer, or both) and does not penetrate into the carrier itself. The focus of the laser may be adjusted so that the penetration depth is reduced. The focal point of the laser may be adjusted so that the laser does not penetrate the carrier. However, the depth of the laser may be adjusted further into the carrier so that the carrier may be bonded or attached to a bag or other article of manufacture. The laser may be pulsed so that the carrier is not overheated. The angle of the laser may be adjusted so that the laser does not penetrate directly down (i.e. 90 degrees) into the carrier (i.e. applied at about a 10 degree angle, about a 20 degree angle, about a 45 degree angle, or about a 60 degree angle).

The electrical conductor may be connected by solder. A solderable ink may be used to create the first electrically functional layer, the second electrically functional layer, or both (e.g. CB 230 made by DuPont may be used). The electrical conductor and first electrically conductive layer, second electrically conductive layer, or both may be soldered together on the carrier. Use of a solderable ink may allow for connection of the electrical conductor without damaging the carrier. It is contemplated that the electrical conductor and the first electrically conductive layer, second electrically conductive layer, or both may be connected without the addition of any other material.

A weld joint and/or solder joint (i.e. joint) may be created when the connector is attached to the first electrically conductive layer, the second electrically conductive layer, or both. The joint may have a depth between about 10 microns to about 1000 microns, between about 35 microns to about 500 microns, about 50 microns to about 200 microns, or about 65 microns to about 150 microns. The depth of the joint, as used herein, includes the thickness of the first electrically functional layer, the second electrically functional layer, and the thickness of the electrical connector (and any incidental transformation of the carrier).

The joint may be of a similar shape and size when Ultrasonic welding, laser welding, soldering, or a combination thereof are used. However, the size and shape of the joint structure may vary between Ultrasonic welding, laser welding and/or soldering. The one or more joints may be long. The one or more joints may be short. The one more joints may form a circle, oval, square, straight line, curved line, a J-shape, an X-shape, a donut shape, or a combination thereof. Preferably, the one or more joints will have a relatively small surface area; however, the one or more joints may be a relatively large surface area. The one or more joints may be raised (i.e. have a height dimension above the first electrically conductive layer, the second electrically conductive layer, or both). Preferably, the one or more joints will be substantially flat when compared to other connection devices discussed herein. The one or more joint may have a varying height as the joint approaches the electrical conductor. However, the one or more joints may have a substantially uniform height profile. The one or more joints may have a length of about 5 cm or less, about 2 cm or less, about 1.5 cm or less, about 1.0 cm or less, or even about 0.8 mm or less. The one or more joints may have a width of about 1 cm or less, about 0.8 mm or less, about 0.5 mm or less, or even about 0.3 mm or less. The height of the one or more joints may be about 1 mm or less, about 0.8 mm or less, about 0.5 mm or less, or even about 0.1 mm or less.

Preferably, the electrical conductor may be attached by the mechanical fastener described herein. The present teaching, preferably, employs a two part mechanical fastener. The mechanical fastener may be made of any metallic material that conducts electricity. The mechanical fastener may be made of brass or copper. Preferably, the mechanical fastener is made of brass or copper and is plated with silver. The mechanical fastener may be free of rivets. The mechanical fastener may be free of separate attachment devices. The mechanical fastener may be free of a crimp.

An attachment portion may include one or more posts and a gripper. The one or more posts (i.e. two, three, or four) may extend from the body of the attachment portion. The posts of the attachment portion may be placed through holes in the carrier and then covered by a backing plate. The attachment portion may form an attachment without the use of a backing plate. The backing plate, may include one or more holes (i.e. the backing plate may have the same number of holes as the attachment portion has posts) that generally align with the posts of the attachment portion. The posts may be flared (e.g. bent, flattened, mushroomed, or the like) once the posts are placed inside of the backing plate. The backing plate may be on the non-printed side of the carrier. Preferably, the backing plate may be in contact with the first electrically conductive layer. The attachment portion may be on the printed side of the carrier. Preferably, the attachment portion is on the non-printed side of the carrier.

The gripper may grip the electrical conductor. The gripper may be integrally fixed to the attachment portion. Preferably, the gripper may be on an opposite side of the attachment portion as the posts. The gripper may be on the same side of the attachment portion as the posts. The gripper may extend out as a projection off of a body of the attachment portion. The gripper and electrical conductor may be substantially parallel to the body of the attachment portion. The gripper may run down the middle of the body of the attachment portion. The electrical conductor may be substantially perpendicular to the body of the attachment portion. The gripper may be part of the body of the attachment portion. The gripper may grip only the metal portion of the electrical conductor (i.e. copper wire). The gripper may grip both the metal portion and the outer cover (i.e. coating on the wire) of the electrical conductor. The gripper may grip only the covering, and may have protrusions that enter (e.g. cut, slice, break, penetrate, or the like) the coating so that electrical contact may be made. The fastener may be attached to the carrier and then the electrical conductor or vice versa. The electrical conductor may be placed in the gripper and the gripper may be closed (e.g. crimped, shut, forcing a metal connection through the plastic coating and into contact with the copper wires, locked, intertwined, or the like).

The electrical conductors employed for heating seats typically are an 14, 16, 18, or 20 gauge copper wire or appropriate wire gauge suitable for the current drawn. The present teaching may use an appropriate wire gauge that is suitable for the necessary current draw of the heater. Preferably, the present teaching may use an 18 gauge, a 20 gauge wire, a 22 gauge wire, and possibly even smaller for supplying power to the heater. The present teaching may reduce the size of the wire without sacrificing performance or without increasing failure rates of wires because of multiple design innovations added to the present teaching. The use of other metals (e.g. copper ink in conjunction with a copper wire) has led to an enhanced ability to fuse the copper layer to the copper conductor or the silver layer to a silver conductor as well as enhanced performance (i.e. reduced current and/or reduced surface contact resistance). However, the same results may be seen when dissimilar materials are used (e.g. copper connector and silver layer or vice versa). The electrical connections may be free of rivets or other destructive device that creates a hole in the substrate or carrier to form an attachment.

The electrical conductors may be attached using a low pressure molding. A low pressure molding may be any molding that substantially encases all or a portion of the electrical conductors, a mechanical fastener, the carrier, the first electrically functional layer, the second electrically functional layer, the third layer, the fourth layer, the fifth layer, or a combination thereof. Preferably, the lower pressure molding encases all or a portion of: an electrical conductor, a mechanical fastener, the carrier, the first electrically functional layer, or a combination thereof. The low pressure molding may be free of encasing the second electrically functional layer. The low pressure molding may be used in addition to one or more of the other attachment features discussed herein such as ultrasonic welding, soldering, laser welding, mechanical fastener, paste, or a combination thereof. The lower pressure molding may be used in lieu of the other attachment features discussed herein such as ultrasonic welding, soldering, laser welding, mechanical fastener, paste, or a combination thereof. The low pressure molding may employ any molding technique that results in the electrical conductors and its respective connection portions being substantially enclosed by the low pressure mold. The low pressure mold may be injection molded, insert molding, outsert molding, low-pressure injection molding, reaction injecting molding, resin transfer molding, blow molded, extrusion, pultrusion, or a combination thereof. Preferably, the mold is created using lower-pressure injection molding. The entire carrier may be encased in a low pressure mold. Preferably, substantially only the terminals and connection points will be encased in a low pressure mold.

The low pressure mold may be made of any material that encases the terminals, connection points, wire harnesses, electrical conductors, first electrically functional layer, second electrically functional layer, or a combination thereof. The low pressure mold may be made of a rigid material. Preferably, the low pressure mold may be made of a flexible material. The low pressure mold material may be an insulator. The low pressure mold material may be a dielectric material. The low pressure mold material may be any insulator material or dielectric material that may flow, melt, or both. The low pressure mold may be made of a plastic, a resin, a thermoplastic, silicon, nylon, polypropylene, polyethylene, styrene, Acrylonitrile Butadiene Styrene (ABS), or a combination thereof. The low pressure mold may cover an area of the carrier that is about 50 percent or less, about 40 percent or less, about 30 percent or less, preferably about 20 percent or less, more preferably about 10 percent or less, or even more preferably about 5.0 percent or less of the total area of the carrier. The low pressure mold, including the other components, may have a thickness of about 10 mm or less, about 8 mm or less, preferably about 6 mm or less, or even about 4 mm or less. The low pressure mold may have a thickness of about 1 mm or more, about 2 mm or more, or preferably about 3 mm or more. The low pressure mold may have a width of about 20 mm or more, about 30 mm or more, about 40 mm or more, or preferably about 50 mm or more. The low pressure mold may have a width of about 220 mm or less, about 150 mm or less, about 100 mm or less, or preferably about 75 mm or less (i.e. about 60 mm). The low pressure mold may have a length of about 10 mm or more, about 20 mm or more, or preferably about 30 mm or more. The low pressure mold may have a length of about 300 mm or less, about 200 mm or less, about 100 mm or less, or preferably about 50 mm or less. It is contemplated that each carrier will have one large low pressure mold covering each electrical conductor connection point. However, each electrical conductor connection point may include its own low pressure mold. For example, if there are 2 electrical conductor connection points then the carrier may have two discrete low pressure molds. The low pressure mold may be large enough so that a portion of the low pressure mold extends out of the bite line. Preferably, the low pressure mold may be of any shape and size so that the entire low pressure mold fits in the bite line of the seat. For example, the low pressure mold is completely covered by a back as the low pressure mold sits on the seat and vice versa.

The carrier may include more than three sides, more than four sides, more than five sides, or even more than six sides (e.g. four sides). Preferably, the carrier includes at least four sides. The carrier may include a front edge, a back edge, a first side edge, and a second side edge. The front edge and the back edge may be generally parallel to each other. The first edge and the second edge may be generally parallel to each other. The front edge and back edge may not be parallel to each other (i.e. non-parallel sides). The first edge and the second edge may not be parallel to each other (i.e. non-parallel sides).

The back edge, the front edge, first side edge, second side edge, a combination thereof may include one or more electrodes so that the one or more electrical conductors and/or electrical terminals can attach to the electrode and the heater may be powered. The number of electrical terminals and/or electrical conductors may equal the number of electrodes. Preferably, the number of electrical terminals, electrical conductors, and electrodes are equal. Preferably, the back edge may include two electrical terminals. However, the back edge may include three, four, five, or even six electrical terminals. The back edge or front edge may include one or more terminals (i.e. the place where the electrical terminal, electrical conductor, or both is attached to the electrode forming a terminal). The one or more terminals may be located anywhere along the back edge or front edge. However, the one or more terminals may be located anywhere along the first side edge, the second side edge, or both. The one or more terminals are preferably located on the one or more electrodes. When more than one terminal is used the terminals may not be located diagonally opposite each other. Preferably, the terminals may be adjacent to each other. The terminals, electrical connector, or both may be located at a first location, a second location, or at any location between the first location and the second location.

The back edge, front edge, first side edge, second side edge, or a combination thereof may be straight, curved, even along the entire edge, vary along the entire edge, or a combination thereof. The first side edge and second side edge may mirror each other (i.e. along an axis defined from the midpoints along the first side edge and the second side edge). The first side edge and second side edge may differ from each other. The front edge and back edge may mirror each other. The front edge and back edge may differ from each other. The back edge, front edge, first side edge, second side edge, internal area of the carrier, or a combination thereof may include cut outs, slits, projections, other openings, or a combination thereof that allow the carrier to bend and flex to conform to the shape of the seat. These may allow for the carrier to conform to the trenches of the seat so that when the seat is in use the heater may conform to the shape of the user and heat the user. It is further contemplated that they may allow for the heater to bend and flex so that the heater does not break or fail. The first side edge and second side edge may be convergent lines (i.e. may be at an angle that one side of the carrier if extended may intersect). The front edge and back edge may be divergent lines. The front edge and back edge may be generally parallel and may include one or more lobes that may create a non-parallel portion of one of the edges.

The back edge, front edge, or both may include one or more cut outs that project towards the opposite edge. The front edge, back edge, or both may each include one, two, three, four, five, or more cut outs. The cut outs may be located on both the front edge and the back edge. The cut outs may be located on only the front edge or only the back edge. The cut outs may be symmetrically located on the back edge and the front edge (i.e. an axis defined from the midpoints of the front edge and the back edge of the carrier exhibiting mirror symmetry). The cut outs may be asymmetrically located on the back edge and the front edge (i.e. not mirror symmetry). The cut outs may not be directly opposite each other. The cut outs may be laterally offset. The cut outs may be staggered from one side of the heater to the other side of the heater. The cut outs may be substantially rotationally symmetrical. The cut outs may be any geometry (e.g. square, rectangular, triangular, round, half-round, or the like). The cut outs may have a length and a width. The length of the cut outs may be about 10 mm or more, about 20 mm or more, about 30 mm or more, about 40 mm or more, or even about 50 mm or more. The length of the cut outs may be about 100 mm or less, about 80 mm or less, or about 70 mm or less. The width of the cut outs may be about 10 mm or more, about 20 mm or more, about 30 mm or more, about 40 mm or more, or even about 50 mm or more. The width of the cut outs may be about 100 mm or less, about 80 mm or less, or about 70 mm or less. The cut outs may have a length to width ratio. The ratio may be about 1:1 or more, about 1.5:1 or more, about 2:1 or more, or about 2.5:1 or more. The one or more cut outs may be located anywhere along the back edge. The one or more cut outs may be symmetrical. The one or more cut outs may be asymmetrical. If the one or more cut out is asymmetrical then the cut out may have a first length and a second length. If the one or more cut outs are asymmetrical then the cut outs may have a first width and a second width. It is contemplated that the dimensions of the width and length (i.e. first, second, third, etc. . . . ) may correspond with the dimensions recited herein for any of the length and width dimensions. The one or more cut outs may have both a first length and second length and a first width and second width. The cut out may be round, half-round, both, or like, the radius may be about 1 mm or more, about 5 more, about 15 mm or more, and even about 30 mm or more. The cut outs may form an angle. The cut outs may form any angle relative to an edge or end of the carrier. The side walls of a cut out may form an angle relative to the end walls of the cut outs. The cut outs may form an angle of about 30 degrees or more, about 45 degrees or more, preferably about 60 degrees or more, or more preferably about 75 degrees or more measured from a side wall of the carrier or an end wall of the cut out. The cut outs may form an angle of about 150 degrees or less, preferably about 120 degrees or less, or more preferably about 105 degrees or less measured from a side wall of the carrier or an end wall of the cut out. Most preferably the cut outs form substantially a right angle measured from a side wall of the carrier or an end wall of the cut out. Thus, the cut outs may all be at substantially right angles, all be at an angle discussed herein, or a combination of angles.

The first side wall, second side wall, or both may include one or more cut outs. The first side wall, second side wall, or both may each include one, two, three, four, five, or more cut outs. The cut outs may be located at any location along the first side wall, second side wall, or both. The cut outs may be any geometry (e.g. square, rectangular, triangular, round, or the like). The cut outs may have a length and a width. The length of the cut out may be about 30 mm or more, about 50 mm or more, about 70 mm or more, about 80 mm or more, or even about 90 mm or more. The width of the cut out may be about 30 mm or more, about 50 mm or more, about 60 mm or more, about 70 mm or more, about 80 mm or more, or even about 90 mm or more. The cut out may have a length to width ratio. The ratio may be about 1:1 or more, about 1.5:1 or more, about 2:1 or more, or about 25:1 or more. The one or more cut outs may be symmetrical (i.e. an axis defined from the midpoints along the top and bottom edges and/or side edges of the cut outs and may exhibit mirror symmetry). The one or more cut outs may be asymmetrical. If the one or more cut out is asymmetrical then the cut out may have a first length and a second length.

If the one or more cut outs is asymmetrical then the cut outs may have a first width and a second width. It is contemplated that the length and width discussed herein may correspond with the dimensions recited herein for the length and width dimensions. The one or more cut outs may have both a first length and second length and a first width and second width.

Preferably, the first side wall and the second side wall may include cut outs that align with a trench in the bun of a seat, the backrest of a seat, or both. The cut outs as discussed herein may be internally located in the carrier (i.e. do not touch an external wall). The internal cut outs may be the same shape and size as the external cut outs described herein. The cut outs that are aligned with a trench may form a neck portion of the carrier. However, the cut outs may be laterally offset and form a neck portion.

The neck portion may be configured so that the neck may be pulled into a trench by an attachment device. The attachment device may be any suitable device for pulling the heater into the trench and holding the heater in the trench. For example, the attachment device may be a listing wire, hog ring wire, hook and loop attachment or the like. The trench may include an anchoring device. The anchoring device may be any suitable device for connecting with an attachment device and securing the heater in the trench of the seat. The anchoring device may be a listing wire, hog ring wire, hook and look attachment, a hook molded into the trench, or the like. The anchoring device may be integrated into the seat (i.e. bun or backrest) when the seat is created. The anchoring device may be added after the seat is created. The heating device when pulled into the trench may fold into itself and conform to the contours of the trench. However, the heater will still maintain its electrical characteristics.

Some or all of the neck portion may be free of any of the resistive material. The electrode structure may be such that it passes at least partially into the neck portion and will be located within a trench. In this regard, any of the neck portion that is located within the trench may include at least a portion of the electrode structure, but may be free of the resistive material, so that heating does not occur in the trench, but electrical conduction does occur. The neck portion may include the first electrically functional layer, the second electrically functional layer, or both. The neck portion may include only one of the electrically functional layers so that the neck portion does not heat up when power is applied. Preferably, the neck portion includes only the first electrically functional layer.

The neck portion may narrow to one or more widths that are about ⅔ or less, about ½ or less, or even about ⅓ or less than the total width of the carrier. The width of the neck portion is the width of the carrier minus any slits, cutouts, or voids located in the neck region. The neck portion may be characterized by rounded corners, corners that are scored for folding, corners that include one or more slits for reducing stress, or any combination.

The first side wall, the second side wall, front wall, back wall, or a combination thereof may include external slits. The first side wall, second side wall, front wall, back wall, or a combination thereof may each include at least one external slits. The first side wall, second side wall, front wall, back wall, or a combination thereof may each include one, two, three, four, five, or more external slits. The external slits may be located at any location along the first side wall, second side wall, front wall, back wall, or a combination thereof. The external slits may be any size and shape (e.g. square, zig-zag, rectangular, pencil shaped, L-shaped, T-shaped, J-shaped, Y-shaped, S-shaped, I-shaped, or the like). The slits may extend into the carrier straight or diagonally. The slits may extend into the carrier at any angle (e.g. about 15 degrees or more, about 30 degrees or more, about 45 degrees or more, about 60 degrees or more, or even about 75 degrees or more) in relationship to the wall the external slit extends from. The slit may be configured so that it is only a cut (i.e. no material has been removed) and there is a round hole at the end of the cut. The external slits may have a length and a width. The length of the external slits may be about 10 mm or more, about 30 mm or more, about 50 mm or more, about 70 mm or more, or even about 90 mm or more. The width of the external slit may be about 1 mm or more, about 5 mm or more, about 8 mm or more, about 15 mm or more, or even about 20 mm or more. The external slit may have a length to width ratio. The ratio may be about 2:1 or more, about 5:1 or more, about 10:1 or more, or about 20:1 or more. The round hole may have a diameter of about 1 mm or more, about 3 mm or more, or even about 5 mm or more.

The front wall, back wall, first side wall, and second side wall define the internal area (e.g. the inside) of the carrier. This inside of the carrier may be free of voids, apertures, slits, cuts, a combination thereof, or any other absence of carrier material that does not touch one of the four walls that define the internal area. The inside of the carrier may include one or more voids, apertures, slits, cuts, or a combination thereof. Preferably, the carrier includes one or more internal slits. The carrier may include at least one internal slit. The carrier may include one, two, three, four, five, or more internal slits. As is described herein an internal slit does not contact the front wall, back wall, first side wall, second side wall, or any combination thereof. The one or more internal slits may be any shape and size. The one or more internal slit may be long and thin. The internal slits may be short and fat. The internal slits may be straight. The internal slits may run lengthwise. The internal slits may run widthwise. The internal slits may curve. The internal slits may run diagonally. The internal slits may be any shape described herein for an external slit or vice versa. The internal slits may have a length and a width. The length of the slits may be about 50 mm or more, about 150 mm or more, about 300 mm or more, about 450 mm or more, or even about 600 mm or more. The length of the slits may be about 100 cm or less, about 90 cm or less, or even about 80 cm or less. The width of the slits may be about 1.0 mm or more, about 3.0 mm or more, about 5.0 mm or more, about 7.0 mm or more, or even about 10.0 mm or more. The width of the slits may be about 50 mm or less, about 40 mm or less, or about 20 mm or less. The slits may have a length to width ratio. The ratio of length to width may be about 4:1 or more, about 10:1 or more, about 50:1 or more, about 100:1 or more, about 500:1 or more, or even about 1000:1 or more.

The carrier may include one or more single apertures having plural different opening widths across the heater. By way of example one or more internal slits may be sized so that they connect with one or more cutouts to form a single aperture. The internal slits may project from one side of the cutouts. The internal slits may project from both sides of the cut out. It is contemplated that an external slit may contact one side of a cutout. Preferably, an external slit and a cutout may not come into contact. The width of the slits (e.g. internal slit or external slit) may vary as the slit approaches a cut out (e.g., become thicker or thinner).

The carrier may include one or more of the cutouts, internal slits, external slits, voids, apertures, carrier configuration, or the like that align with the bite line of the seat. Two external slits may be placed in alignment with the bite line of the seat so that the electrical terminals are placed inside the bite line of the seat. The carrier may not extend into the bite line of the seat. Only the electrical conductor may extend into the bite line (i.e., the carrier stops short of entering into the bite line). It is contemplated that a thin neck portion as discussed herein may be placed in alignment with the bite line similarly as the thin neck portion is used in conjunction with a trench.

It is further contemplated that the layers attached (i.e. third layer, fourth layer, fifth layer, or sixth layer) to the carrier may include configurations (e.g. internal slits, external slits, cutouts, holes, apertures, or any other configuration discussed herein). In one embodiment, the third layer may include a configuration and the fourth layer and fifth layer may not include the configuration or vice versa. These configurations may mirror the shape of the carrier. The configurations may mirror a portion of the carrier (i.e. include cutouts but not slits or vice versa). The layers attached to the carrier may be free of configurations (i.e. internal slits, external slits, cutouts, holes, apertures, or any other configuration discussed herein). The layers may have configurations (i.e. slits, cutouts, apertures, voids, or the like) placed at a location independent of the location on the carrier. Preferably, the layers include at least one or more of the configurations.

The carrier may further include one or more lobes. The one or more lobes may be located anywhere on the outside periphery of the carrier. The lobes may be located adjacent to a cutout and internal slit. The lobes may include an external slit. Preferably, the lobes will be located adjacent to a cut out or external slit. The lobes may include electrically functional layers. The lobes may be free of electrically functional layers. The lobes may include one or more electrodes, or the lobes may be free of electrodes. The lobes may include terminals, or the lobes may be free of terminals. The lobes may assist the carrier in conforming to a seat, a trench, a contour, or a combination thereof. The lobes may be symmetrically located on the carrier (i.e. an axis defined from the midpoints along the top and bottom edges of the carrier may exhibit mirror symmetry.) Preferably, the lobes may not be symmetrically located on the carrier (i.e. an axis defined from the midpoints along the top and bottom edges of the carrier may not exhibit mirror symmetry).

It is contemplated that the design innovations to the carrier described herein may allow a carrier to be created that is "one size fits all." In other words, it is contemplated that one carrier may be used and applied to different seating configurations. The carrier of the teaching may be able to conform to seats with different trench configurations and sizes. For example, the carrier of the teaching may be used with a seat with trenches configured in an "H" shape, and the carrier of the teaching may be used with a seat with three parallel trenches. The carrier may be used with a seat with one horizontal trench or one vertical trench. The carrier may be used in conjunction with seats with different sized seating cushions and backing cushions due to the conformability of the carrier of the teaching. Furthermore, the terminals may be located anywhere along the electrodes, thus, providing some individualization of each carrier without having to redesign the shape and size of each carrier. The terminals and/or electrical terminals may be moved along the electrode, and the heater may maintain its function and performance.

The seat heater may be used in conjunction with an occupant sensor. An occupant sensor may be used on any seat in conjunction with a heater. Preferably, an occupant sensor may only be used on passenger seats. The heater may include one or more locators so that the heater and the occupant sensor are aligned on the seat. The locators may be of any shape, size, quantity, or a combination thereof so that the heater and the occupant sensor are aligned. There may be 2, 3, 4, 5, or even 6 locators on a carrier. Preferably, the locators may be located on the edges of the heater. The heater may be placed under the occupant sensor. Preferably, the heater is located over the occupant sensor. The locators may be in the form of printed markings on the occupant sensor and matching markings on the heater. Preferably, the locator is a hole or cut-out in the occupant sensor that matches the holes or cut-outs in the heater. The locators may be used for assembling the occupant sensor, heater, or both properly in an article of manufacture (i.e. a seat).

The carrier may be used in conjunction with a seat that includes ventilation, active cooling, active heating, or a combination thereof. The carrier may be used with a ventilated, active cooling, active heating, or a combination thereof seat that uses a bag configuration to distribute heat and/or cool air. One example of a bag is illustrated in U.S. Pat. No. 6,869,140, incorporated by reference. The heater may be placed above the bag. The heater may be placed below the bag. The heater may be placed in the bag. The heater may be used to heat the fluid as it passes from the blower on the way to the occupant. The heater may form a portion of the bag (i.e. the heater may be attached so that it forms the top surface of the bag). The bag may include a top surface, a bottom surface, and one or more connecting walls. The heater may be attached to the bag by welding, gluing, taping, adhering, or the like. Preferably the heater is ultrasonically welded to the one or more connecting walls so that a bag is formed. The ultrasonic techniques discussed herein may be used to ultrasonically weld the heater to the other surfaces thereby forming a bag. Preferably, the heater and the other surfaces are made of a similar material (i.e. a plastic material). The bag may include at least three layers. The at least three layers may include a bottom layer, a three dimensional spacer, and a upper layer. The top and bottom layer may be ultrasonically welded together along the perimeters, with the spacer in between them. The top layer may contain holes or cutouts for air circulation. The bag may be attached to the air mover. The heater may be placed in the bag with the spacer. The heater may be placed in the bag without adding a spacer. The heater may perform the same functions as the spacer.

The first electrically functional layer, second electrically functional layer, or both may be applied to the carrier in any design. The layers may be applied as continuous strips. The layers may be applied in an interdigitated pattern. The layers may be free of interdigitation. The layers may be free of traces that surround voids, slits, apertures, or any absence of material in the internal area of the carrier. The layers may be free of branches, spurs, ground extensions, or any combination thereof. The first electrically functional layer may be completely covered by the second electrically functional layer and vice versa. The first electrically functional layer may be partially covered by the second electrically functional layer and vice versa. The first electrically functional layer may not be covered in areas by the second layer. The second electrically functional layer may not be covered in areas by the first electrically functional layer. The neck portion may include both the first electrically functional layer and the second electrically functional layer. Preferably, the neck portion will be free of either the first electrically functional layer or second electrically functional layer so that the neck portion does not heat up. More preferably, the neck will be free of the second electrically functional layer.

The first electrically functional layer, second electrically functional layer, or both may form a peripheral electrode that includes ends that do not touch. Preferably, the first electrically functional layer, second electrically functional layer, or both may form a continuous peripheral electrode with no ends. The first electrically functional layer, second electrically functional layer, or both may form one or more electrodes (i.e. two electrodes, three electrodes, four electrodes, or more).

In one embodiment, the first electrically functional layer may form a first electrode with no ends that continuously circumscribes the peripheral edge of the carrier. The first electrically functional layer may form a first electrode with no ends that circumscribes a portion of the peripheral edge (e.g. the first electrode may circumscribe the edge on one side of the trench and not follow the edge on the other side of the trench). The first electrode may be negative. Preferably, the first electrode will be positive. The first electrically functional layer may form a second electrode that may be located inside of the first electrode. The second electrode may be positive. Preferably, the second electrode may be negative. The second electrode may mirror the shape and pattern of the first electrode. The first electrode and second electrode may surround and/or follow the shape of internal slits, external slits, cutouts, voids, apertures, through-holes, or the like. The second electrically functional layer may form a continuous second electrode with no ends. Both the first electrode and second electrode may include one or more fingers that extend out from the electrode in the direction of the other electrode. Preferably, the fingers will not contact the electrode of an opposing polarity.

The first electrode and the second electrode may have a continuous width. The width of the electrode may gradually become smaller as the distance from the terminal becomes larger. The width of the electrodes may vary and become smaller. The width may be between about 1 mm and about 3 cm, between about 2 mm and about 2 cm, between about 3 mm and 1 cm, or even between about 4 mm and about 8 mm. The width may be between about 0.1 mm and about 2 cm, between about 0.5 mm and about 1 cm, between about 1 mm and about 6 mm, or even between about 2 mm and 5 mm.

The area of the electrodes may vary (i.e. width, thickness, density, or a combination thereof). The area of the electrode may be the smallest at the terminals (i.e. at the power connection point). Preferably, the area of the electrode is the largest at the terminals. The area of the electrode may gradually become smaller as the distance from the terminal becomes larger. The area of the electrodes may decrease in proportion to the amount of current required by the remaining circuit of each individual electrode. The area of a discrete electrode (i.e. an electrode with ends) may be largest at the terminal and smallest at the end furthest from the terminal. The area of a continuous electrode (i.e. an electrode with no ends) may be largest at the terminal and smallest at a point that is half of the total length of the electrode (i.e. half way around the electrode from the terminals). The voltage drop of the discrete electrode and the continuous electrode may be the same (i.e. the area of the electrode may decrease incrementally by the same amount). The voltage drop of the discrete electrode and the continuous electrode may not be the same; therefore, the area of the discrete electrode or the continuous electrode may become smaller at different rates. Preferably, the area of the continuous electrode will be reduced by half of a discrete electrode. The carrier may include one or more first electrically functional layers that form one or more electrodes.

Preferably, the carrier includes at least two electrically functional layers. More preferably, the carrier includes at least two electrodes.

The second electrically functional layer may cover the fingers of the first electrode, second electrode, or both. The second electrically functional layer may not cover the entire finger. The second electrically layer may cover the entire finger (i.e. length and width). The second electrically functional layer may contact only one positive finger and one negative finger. The second electrically functional layer may touch one or more fingers. The second electrically functional layer may contact the carrier in-between the fingers. The second electrically functional layer my not contact the carrier in-between the fingers. The amount of second electrically functional layer applied (density, thickness, area, or a combination thereof) may be constant across the heater. The amount of the second electrically functional layer that is applied may vary from one side of the carrier to the other side of the carrier (e.g. one side of the trench may have more second electrically functional layer than the other side of the trench). The amount of the second electrically functional layer applied may be inversely proportional to the width of the electrode (i.e. as the electrode becomes narrower the amount of second electrically functional layer is increased (i.e. increased density, thickness, area, or a combination thereof)) so that resistance is reduced accordingly.

The heater may have one power level. The heater may have two or more power levels. The heater may have a high power level. The heater may have a medium power level. The heater may have a low power level. The heater may have a variable power control feature. The power level may be varied by using a controller. The power level may vary by incremental steps or may vary continuously from low level to high power level. The heater may not use power resisters to regulate temperature. The controller of the heater may be free of power resistors for heat dissipation. The power level of the heater may be varied by any of the methods disclosed in U.S. Pat. No. 7,036,283, incorporated by reference herein. The controller (not shown) may use pulse width modulation (PWM) signals to generate a duty cycle to the heater in order to control the temperature, power level, or both. The controller may use any analog input signal (momentary contact, resistive arrays, potentiometer, etc) to generate duty cycle to the heater in order to control the temperature, power level, or both. The controller may use a digital input signal (including PWM) to generate a duty cycle so that the heater temperature, power level, or both are controlled.

The heater may be run by an AC power source. Preferably, the heater may be run by a DC power source. The power level (i.e. temperature) of the heater may vary based on the duty cycle generated by the pulse width modulated signal that is provided from the controller. The heater may be preprogrammed with a duty cycle for each power level. Thus, a user may vary the temperature of the seat by selecting a different power level, which changes the duty cycle. The duty cycle may be a proportion of the time that the power is "on" during an interval or period of time. For example, if the heater has a duty cycle of 30 percent this means that the heater is "on" 30 percent of the time and "off" 70 percent of the time. The heater may have a duty cycle between about 0 to about 100 percent. Preferably, the heater will have different duty cycles for each power level. For example, the heater may have three settings (e.g. high, medium, and low). The high setting may have a duty cycle of between about 70 to about 100 percent (i.e. between about 80 percent and about 100 percent). The medium setting may have a duty cycle of between about 50 to about 80 percent (i.e. between about 60 percent and about 80 percent). The low setting may have a duty cycle between about 30 to about 60 percent (i.e. between about 40 percent and about 60 percent). It is contemplated that if the heater has less than three power settings any of the power settings discussed herein may be used. The heater may not draw power when the duty cycle is "off."

It is contemplated that the heater may self-regulate temperature. The heater may include a feedback loop (i.e. a sensor). The heater may further include a controller in communication to the feedback loop. The controller and feedback loop may allow the user to input an exact temperature so that the heater varies the duty cycle to continuously adjust the temperature of the heater. The controller may directly regulate the heater. For example, the controller may receive one or more inputs and/or external data and regulate the temperature based on these inputs. The controller may indirectly regulate the heater. For example, the controller may receive one or more commands from another controller and then the controller regulates based upon the commands from the other controller that receives the one or more inputs and/or external data. The one or more inputs may be from a temperature sensor, a user, a pressure sensor, fan speed, or a combination thereof.

It is further contemplated that the heater may regulate using pulse width modulation (PWM) in combination with the self-regulation characteristics of the positive temperature coefficient material. Accordingly, the PWM may be set so that the heater receives various power settings to warm up at various temperatures.

The heater may include a controller and a system harness. The controller may receive input signals from the user. For example, when a user changes the temperature setting from high to low the controller receives the signal. The controller may send output power to the heater. For example, once the controller receives the input signal from the user the controller may send the required duty cycle to the heater so that the heater becomes warmer or cooler. The system harness may further receive the power from the power source so that the system harness may send power to the heater. The system harness may include the controller. It is contemplated that the controller may calculate the duty cycle required to control the heater and then send the calculated duty cycle to the heater. Preferably, the system harness will look up the required duty cycle and send the known duty cycle to the heater.

It is contemplated that all of heaters discussed herein may be used in aftermarket applications. The aftermarket applications may be any of the applications discussed herein. For example, may be added to a battery, steering wheel, cup holder, green house for gardening, a vehicle seat, or a combination thereof. The heaters discussed herein may be applied to a "new seat" (i.e. a vehicle being built by an original equipment manufacturer (OEM)). The heaters discussed herein may also be added to a seat after the seat has been installed and the car has been sold (i.e. aftermarket). Thus, the heater may be created in such a manner that the heater may be altered by the installer so that it functions with multiple different articles as discussed herein such as a vehicle seat (i.e. a one size fits all design). For example, the heater may be used with a seat that has an "H" shaped trench configuration and a seat that has a three parallel bar trench configuration. The installer may cut out portions of the heater so that the holes created in the heater align with the trenches. These holes may allow the installer to place a portion of the heater into the trench and secure the heater using the techniques described herein (e.g. hold down with a wire). Preferably, holes may be cut so that one of the attachment devices and/or anchoring devices discussed herein may attach the heater to a seat. The heater may be cut and the entire area of the heater may still function (i.e. heat). Preferably, the heater may be cut so that the portion pulled into the heater does not get hot. The holes created may stop the heater from becoming warm in the area of the heater adjoining the holes. Preferably, the heater will only stop becoming warm in the areas where the holes are created so that they fit into the trench. The holes may not prevent the heater from becoming warm. The heater may include outlines and/or indicators showing where the heater may be cut. The heater may include a guide on the heater so that the installer may reduce the length, width, or both of the heater. The heater may further include guides so that cutouts, internal slits, external slits, holes, cuts, or a combination thereof may be made in the heater without reducing the performance of the remaining portions of the heater.

The heater design may be any of the heater designs discussed herein. The heater may have two electrodes (i.e. one negative and one positive). The two electrodes may be continuous. The two electrodes may have ends. The two electrodes may be parallel to each other. The two electrodes may not be parallel to each other. The two electrodes may be parallel to each other in some areas and not be parallel in other areas. The two electrodes may be disposed on the carrier so that they are opposite each other. The two electrodes may have fingers. The fingers may project out from one of the electrodes towards the other electrode without the two electrodes touching. The fingers may project out from both electrodes towards each other without touching the opposite electrode or opposite fingers. The fingers may form an interdigitated pattern. The fingers may not form an interdigiditated pattern. The fingers may be cut and the heater may still function. The heater may include any configuration discussed herein for patterns, materials, connection devices, connection methods, or a combination thereof. For example, a heater may be created by using the methods discussed herein and then the cutouts, internal slits, external slits, lobes, holes, apertures, the like, or a combination thereof are added to the heater so that it may be installed into a seat.

A heater may be made by different methods. A substrate or carrier may be obtained. A first electrically functional layer may be applied to the carrier forming one, two, or more electrodes. A second electrically functional layer may be applied over the first electrically functional layer that is disposed on the carrier. The second electrically functional layer may contact portions of one or more electrode. A third layer may be applied over all or a portion of the carrier, first electrically functional layer, second electrically functional layer, or a combination thereof. The first electrically functional layer, second electrically functional layer, or both may be applied by any method disclosed herein. The electrically functional layers may be created by inkjet printing. The electrically functional layers may be applied by any ink jet printer. Preferably, the electrically functional layers may be created by screen printing. Application of the layers may create electrodes, strips, heating regions, quadrants, or other areas that heat up. The layers may be free of strips, heating regions, quadrants, or a combination thereof. An electrical terminal may be attached to the electrode. The electrical terminal may be attached to the electrode using any attachment method disclosed herein. Preferably, the electrical conductor is attached using an attachment portion with posts and a backing plate. A fourth layer may be added to the carrier, first electrically functional layer, second electrically functional layer, or all three after the electrical terminal is attached. A fourth layer may be added to the first electrically functional layer, second electrically functional layer, or both after the third layer is added. The fourth layer may be added to the first electrically functional layer, second electrically functional layer, or both after both the electrical terminal is attached and the third layer is added. The fourth layer may be used to connect a fifth layer to the carrier. The fifth layer may be attached on the non-printed side of the carrier. The heater may be placed on a seat cushion or a back rest. The heater may be attached to the cushion or the back rest using an attachment device. The attachment device may be a listing wire and okley dips. The attachment device may be two way tape (i.e. peel & stick tape) which is placed on the fifth layer or directly on the non-printed side of the carrier. The heater may be covered with a trim layer. Cut outs, internal slits, external slits, or a combination thereof may be added to the carrier when the carrier is created. Cut outs, internal slits, external slits, or a combination thereof may be added to the carrier after the carrier is created.

FIG. 1 illustrates a heater that includes a carrier 2 with a first layer 4 and a second layer 6 disposed on the carrier 2. The carrier includes a front edge 14, a back edge 16, a first side edge 18, a second side edge 20, and tabs 44. The carrier 2 includes two cut outs 26 in the central region of the carrier 2 forming a thin neck portion 28. The cut outs include a length (L) and a width (W). The length and widths of the cut outs vary so that the cut outs in the carrier include a second (L') and a second (W'). One cut out is asymmetrical and includes a first length (L1) and second length (L2). The external slits have a length (L") and a width (W"). As shown the length and width of the external slits vary. The carrier 2 also includes a cutout 26 along the back edge 16 of the carrier 2 and an external slit 36, which in combination form a lobed portion 42. The carrier 2 includes an internal slit 38 that virtually runs the length of the carrier. The internal slit includes a length (A) and a width (B). The carrier includes two electrodes 24. A portion of the first layer 4 forms a positive electrode 46 and a negative electrode 48. The electrodes have a width (X). An electrical conductor 12 is attached to the positive electrode 46 and the negative electrode 48 forming terminals 22.

FIG. 2A includes a cross sectional view of a heater 300. The heater 300 is covered by a trim layer 40. The heater includes a carrier 2 with a first layer 4 and a second layer 6 disposed on the carrier 2. An electrical conductor 12 is attached to the carrier 2 and in electrical communication with the first layer 4. The first layer 4 and second layer 6 are covered by and attached to a third layer 8. The third layer 8 is covered by a fourth layer 50. The fourth layer 50 is covered by a fifth layer 10. The third layer 80 is attached to the fifth layer 10 via the fourth layer 50. The heater 300 may be placed over or in an article of manufacture (not shown).

FIG. 2B includes another cross sectional view of a heater 300. The heater 300 includes a carrier 2. The carrier 2 has a first layer 4 and a second layer 6 disposed on the carrier 2. An electrical conductor 12 is attached to the carrier 2 and in electrical communication with the first layer 4. A third layer 8 attaches a fifth layer 10 to the carrier 2. The third layer 8 covers the first layer 4, the second layer 6, and the electrical conductor 12. The heater 300 may be placed over or in an article of manufacture (not shown).

FIG. 3 illustrates a heater 300 located on a seat 302. The seat 302 includes a trench 30 so that a thin neck portion 28 of the heater 300 aligns with the trench 30. An attachment device 32 pulls the thin neck portion 28 into the trench 30 and attaches the thin neck portion 28 to the seat via the anchor device 34 in the trench 30. The heater 300 is aligned with the trench 30 via the tabs 44 along the edges of the heater. The heater 300 includes cut outs 26 and external slits 36.

Figure 4A:
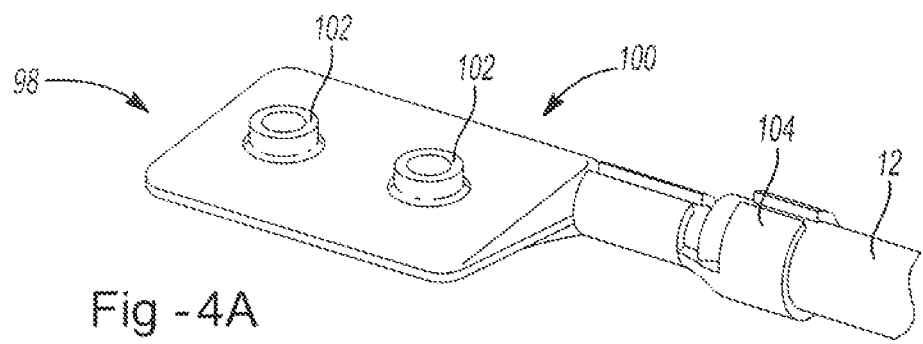
FIG. 4A is a perspective view of one possible configuration for a mechanical fastener.
Figure 4B:
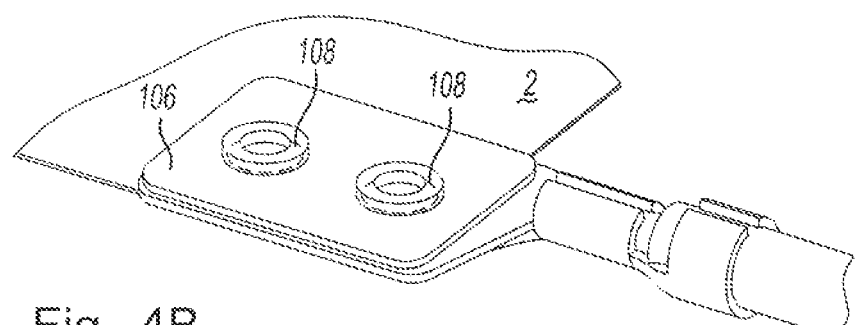
FIG. 4B illustrates one example of attaching the mechanical fastener of FIG. 4A to a heater.

FIG. 4A illustrates an electrical conductor 12. The electrical conductor 12 is attached to the electrical terminal 98 via an integral gripper portion 104. The electrical terminal 98 further includes an attachment portion 100 with integral two posts 102. FIG. 4B illustrates the attachment portion 100 attached to a backing plate 106 with the carrier 2 sandwiched between the attachment portion 100 and the backing plate 106. The posts 102 have been expanded so that the posts are flanged 108 and hold the backing plate 106 and the carrier in contact with the attachment portion 100 so that electricity flows from the electrical conductor 12 into the carrier 2 via the electrical terminal.

Figure 5A:
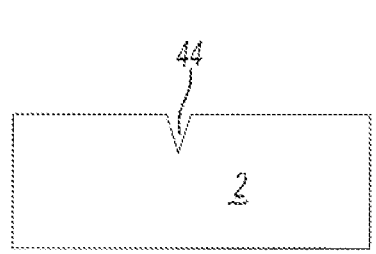
FIGS. 5A-5C illustrate some additional embodiments of the tabs.
Figure 5B:
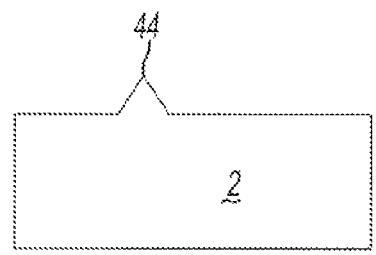
Figure 5C:
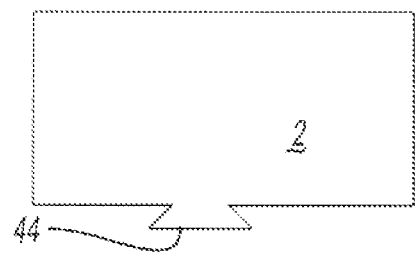

FIG. 5A-5C illustrates three different embodiments of tabs 44 that are formed on the carrier 2. FIGS. 5B and 5C illustrate external tabs 44 and FIG. 5A illustrates an internal tab 44.

Figure 6A:
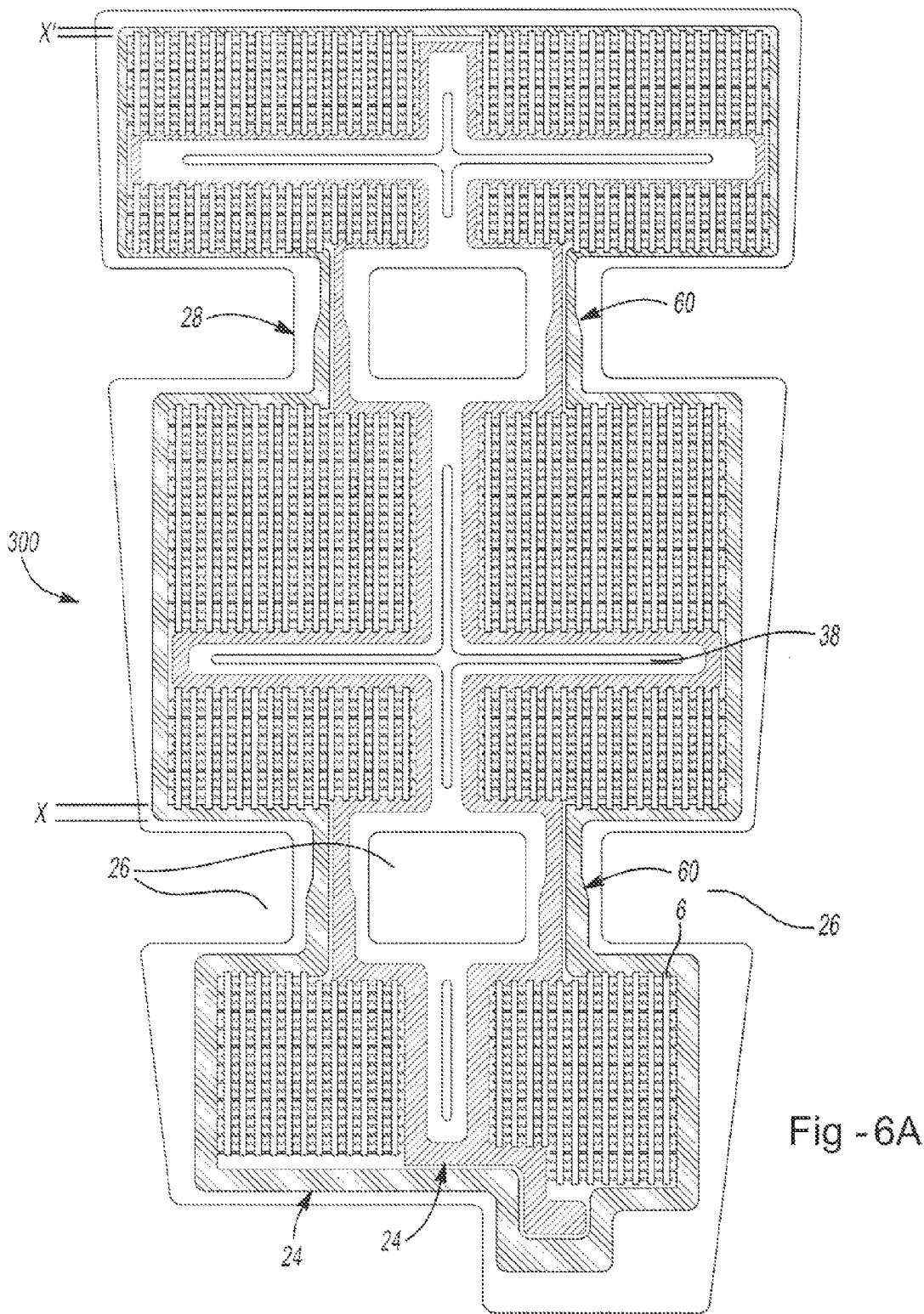
FIGS. 6A and 6B illustrate embodiments of the present teachings with electrodes that have a variable width and pattern, and another possible shapes of a heater.
Figure 6B:
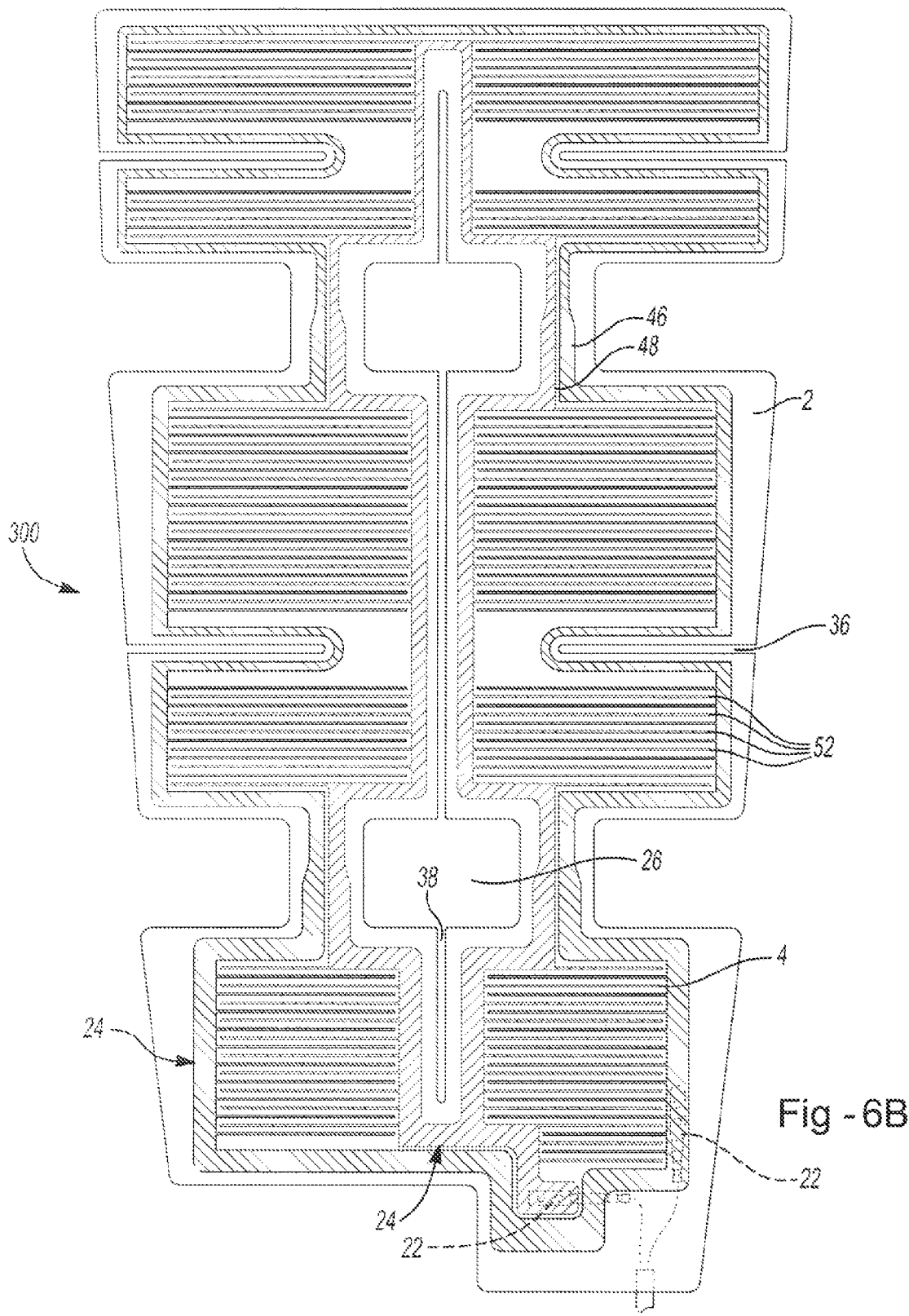

FIGS. 6A and 6B illustrate different heater designs 300. FIGS. 6A and 6B include different internal slit 38 and external slit 36 configurations. The configuration of the electrodes 24 substantially mirrors the internal slits 38 and the external slits 36 respectively. FIG. 6B includes two external slits 36 on each side of the carrier 2, and 6A is free of external slits. FIG. 6A is illustrated including the second layer 6 and FIG. 6B is illustrated without the second layer 6 for illustration purposes only so that the first layer 4 and the fingers 52 are visible. FIGS. 6A-6B include a positive electrode 46 and a negative electrode 48. The electrodes include a first width (X) and a second width (X'). The width gradually becomes smaller as the distance from the terminals 22 become larger. The width of the electrodes 24 change thickness in the thin neck portion 28 by steps 60. The electrodes 24 maintain a constant thickness and then at the steps 60 decrease thickness. FIG. 6A includes internal slits 38 that are separate from the cut outs 26. In FIG. 6B the internal slits 38 are connected to the cut outs 26 forming one large internal opening.

FIG. 7 illustrates a heater 300 with multiple cut outs 26 around the outside of the heater 300. The cutouts are an external slit with a round hole 120 on the inside where material is removed. FIG. 7 illustrates a thin neck region 28 formed in the center of the heater between to asymmetrically located cut out portions 26. The heater includes a positive electrode 46 and a negative electrode 48 with a terminal 22 that includes an electrical terminal 98. The electrodes have a width (X) and another width (X'). In FIG. 7 the electrodes continuously become thinner along the length of the carrier.

Figure 8:
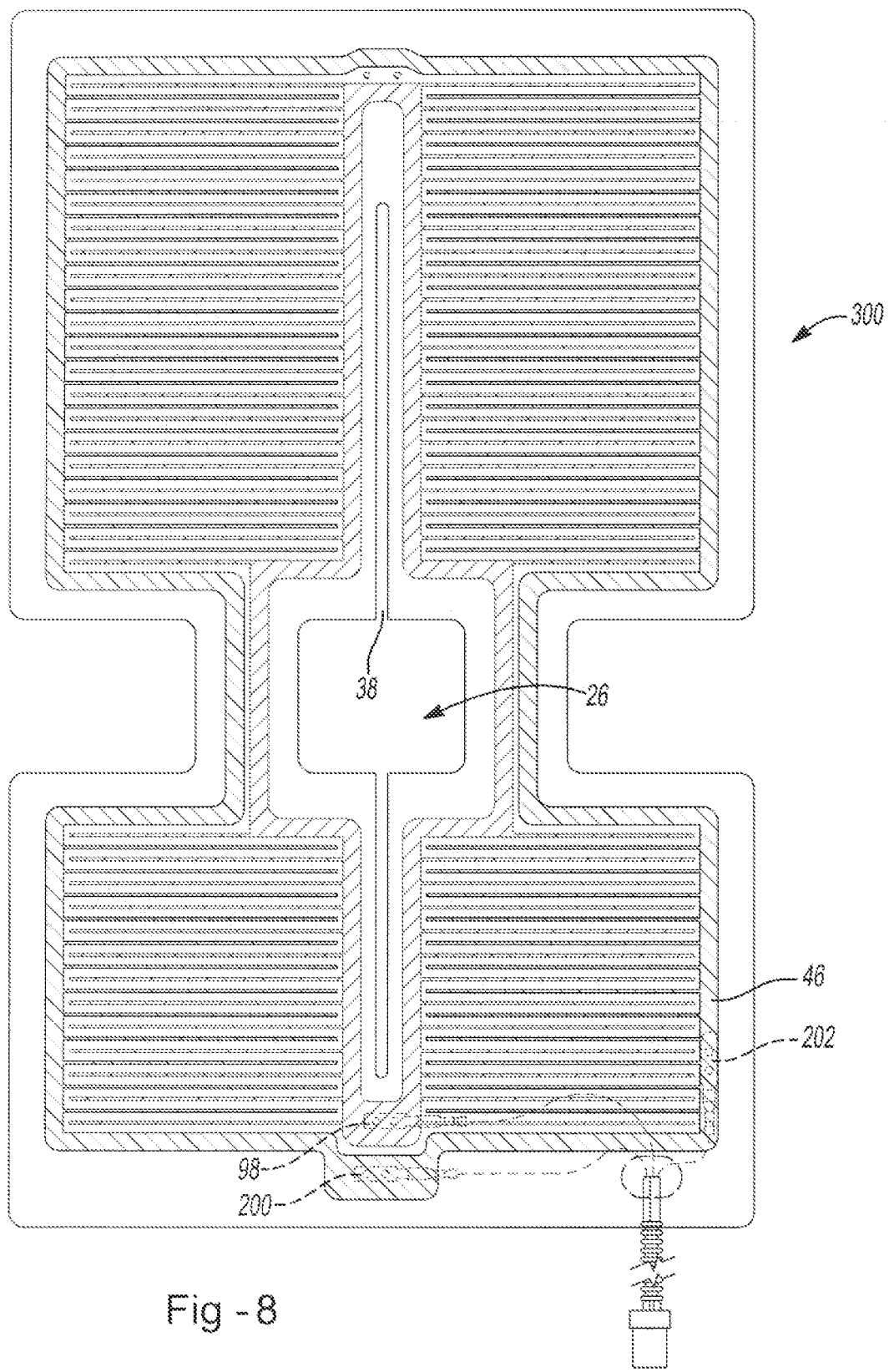
FIG. 8 illustrates one possible configuration for a carrier.

FIG. 8 includes another possible configuration for a heater 300. The heater includes a cut out 26 that intersects with an internal slit 38 and forms an integral central region. FIG. 8 further illustrates different possible locations for the electrical terminals 98. In this example, the electrical terminal 98 on the positive electrode 46 is illustrated in two possible locations to illustrate different possible locations of the electrical terminal 98. The first location 200 is located in the center of the heater on the positive electrode 46, but the electrical terminal 98 is also illustrated on a side of the heater at a second location 202. FIG. 8 is illustrated without the second layer for illustrative purposes so that the first layer is visible.

Figure 9:
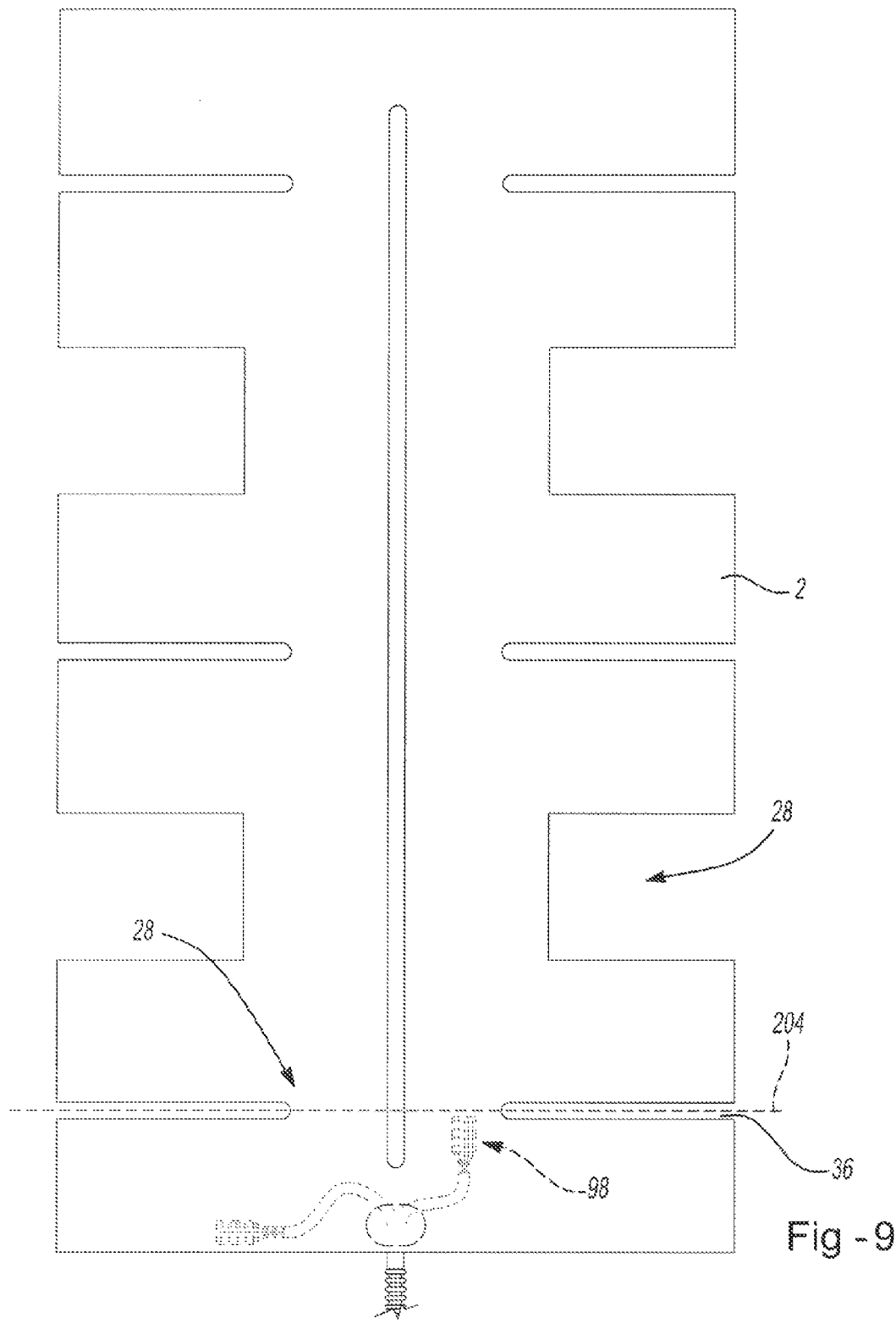
FIG. 9 illustrates another possible configuration for a carrier.

FIG. 9 illustrates one possible configuration for a carrier 2 before any layers have been applied to the carrier 2. The carrier includes electrical terminals 98. FIG. 9 is illustrated with none of the electrically functional layers for illustration purposes only so that the electrical terminals 98 are more clearly shown. The electrical conductor is attached to the carrier 2 without the use of a mechanical fastener. FIG. 9 illustrates that the bite line 204 of the seat may align with an external slit 36 that forms a thin neck portion 28. As illustrated the electrical terminals 98 are past the bite line 204 so that they fit between the seat and the back portion and are protected from damage.

Figure 11A:
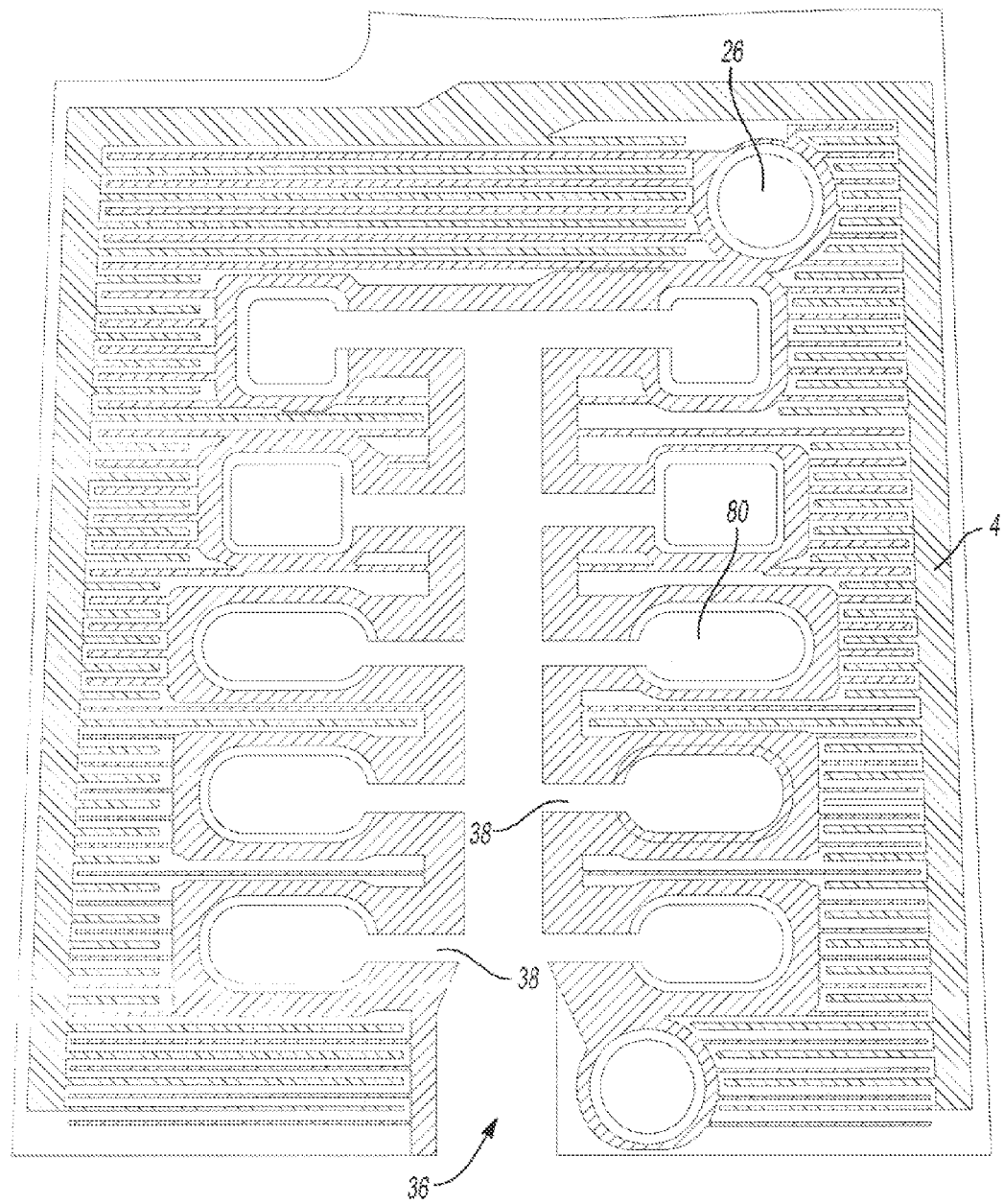
FIGS. 11A-11B illustrate yet more possible configurations for a heater.
Figure 11B:
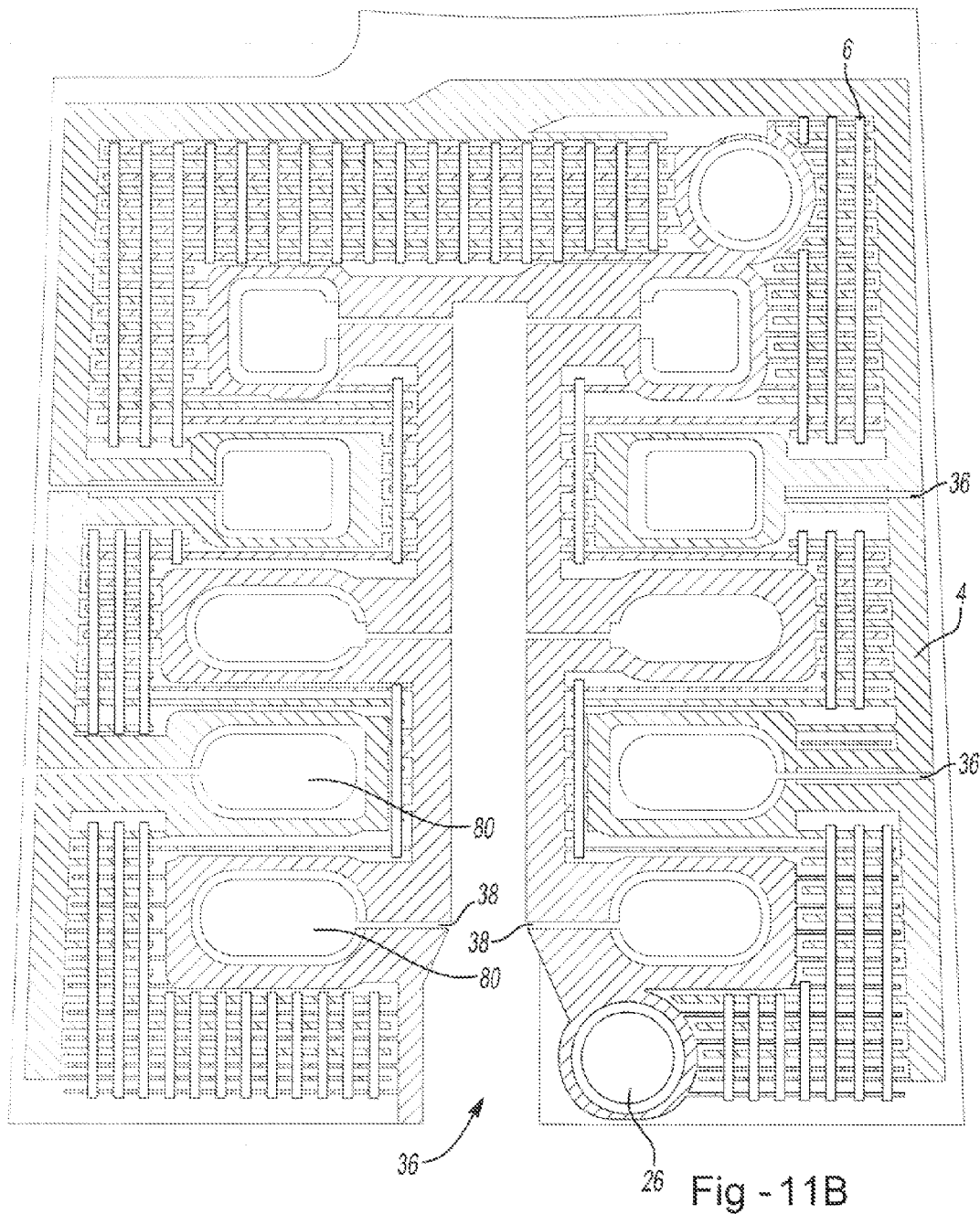

FIGS. 10 and 11A-11B are three possible heater designs that can be employed with a ventilated or air-conditioned seat. It is contemplated that these designs may be also be solely as a heater. The heater of FIGS. 10 and 11A-11B may be placed on an insert so that the cross-sectional view of FIG. 2 would include an insert (not shown) below the heater 300 so that air is passed through the heater 300 towards the user. FIGS. 10 and 11A-11B include features 80 and cut outs 26 so that air is blown through the heater 300 towards the user. FIGS. 11A-B further include internal slits 38 that project from one large external slit 36 and intersect with a feature 80. FIG. 11B illustrates an external slit 36 intersecting with a feature 80. FIG. 11B is illustrated with a second layer 6 and FIGS. 10 and 11A are illustrated without the second layer 6 for illustrative purposes only to show the first layer 4.

Figure 12A:
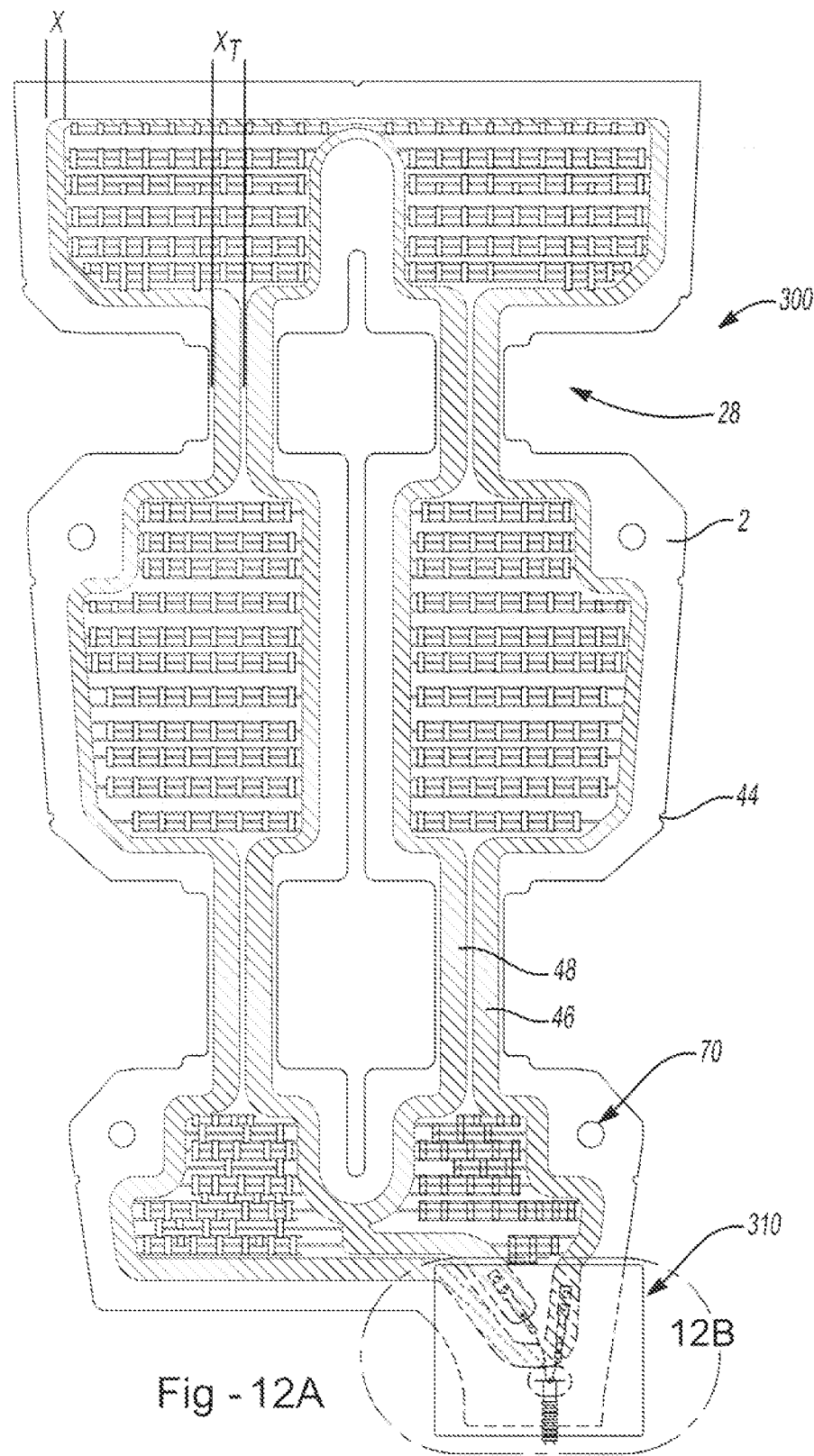
FIGS. 12A-12B illustrate a possible configuration for a heater.
Figure 12B:
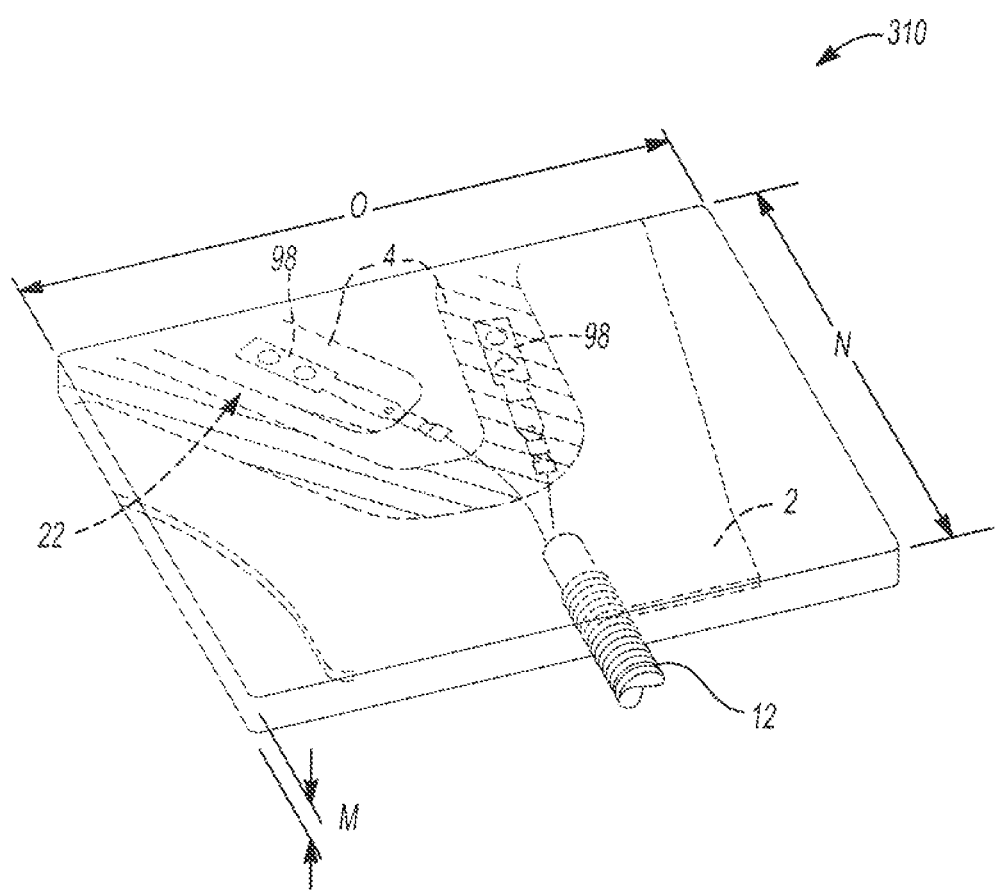

FIG. 12A is another possible embodiment of a heater 300. The heater includes a positive electrode 46 and a negative electrode 48. The electrodes include a first width (X) and a width in the trench region ($X_T$) where the electrode becomes larger in the thin neck portion 28 of the heater 300. The carrier also includes an internal tab 44 similar to the one shown in FIG. 5A. The carrier 2 includes four locators 70 so that the heater and an occupant sensor (not shown) are aligned on the seat cushion. The electrical connectors of FIG. 12A are encapsulated in a low pressure mold 310. FIG. 12B is a enlarged perspective view of the low pressure mold 310 shown in FIG. 12A. The low pressure mold 310 encases the carrier 2 with the first electrically functional layer 4 disposed thereon forming terminals 22. The terminals 22 are connected to the electrical conductors 12 via a mechanical electrical connector 98. The low pressure mold 310 has a thickness (M), a width (N), and a length (O).

Figure 13:
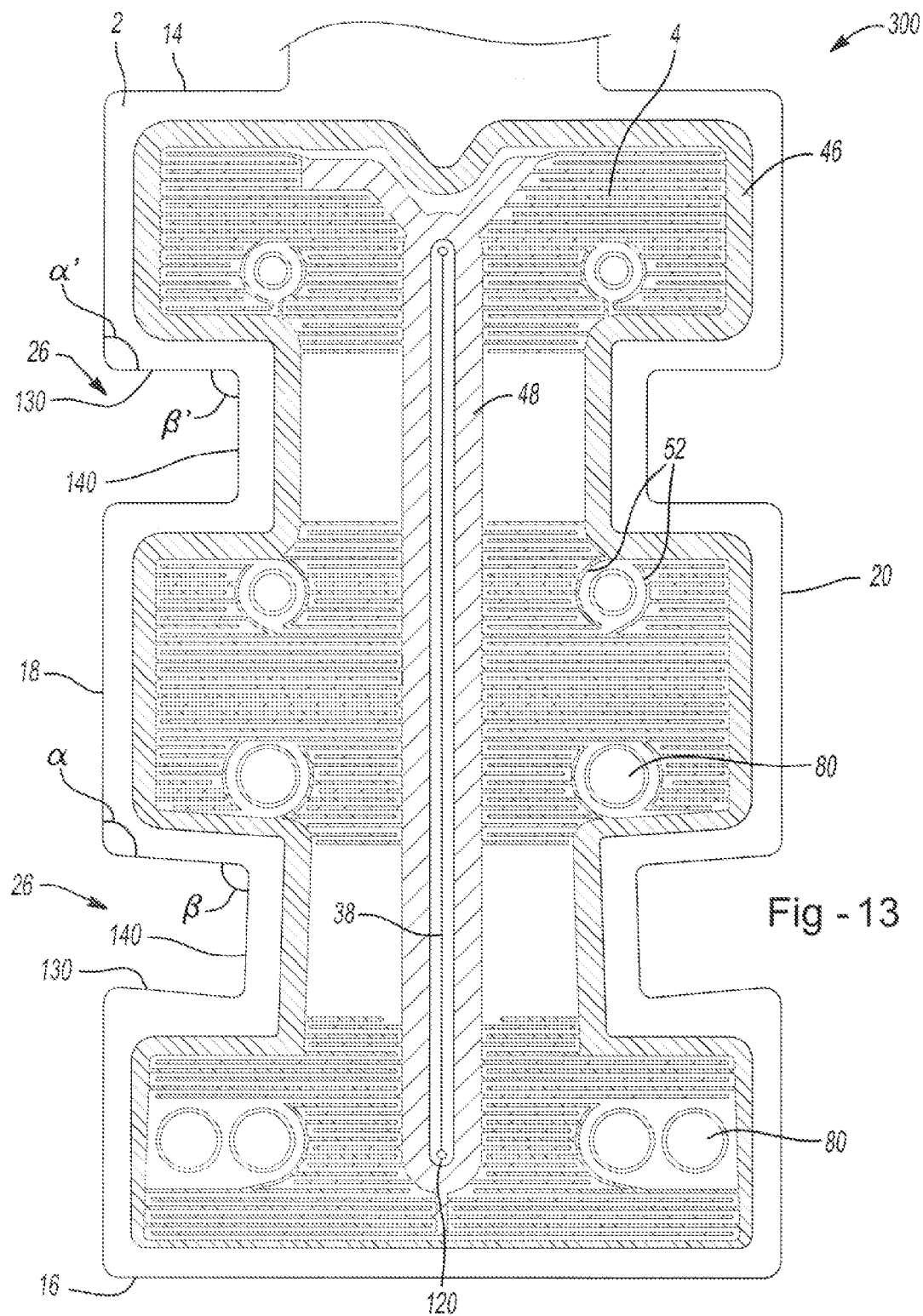
FIG. 13 illustrates another possible configuration of a heater.

FIG. 13 illustrates another possible configuration of a heater 300. The heater includes a carrier 2 that has a front edge 14, a back edge 16, a first side edge 18, and a second side edge 20. The carrier includes a first layer 4 disposed on the carrier. FIG. 13 includes a first layer 4 only for illustration purposes only. The first layer forms a positive electrode 46 and a negative electrode 48 with fingers 52 extending from the respective electrodes. The fingers 52 extend partially around the features 80 in the carrier 2 and do not surround the features 80. This configuration may be employed to avoid uniform heating in this local region. The positive and negative fingers 52 each respectively extend around about 40 percent of the features 80 circumference. The carrier further includes an internal slit 38 that connects with a round hole 120 on both ends. The carrier includes two cutouts 26 on each of the first side edge 18 and second side edge 20 that form thin neck portions 28. The cutouts 26 closest to the front edge are illustrated with the side walls 130 forming substantially a right angle (α') with the side edges 18 and 20, and the side walls 130 form substantially a right angle (β') with the end wall 140. The cutouts 26 closest to the back edge 16 are illustrated at an angle relative to the side edges 18 and 20 so that the cutouts 26 are generally angled towards the back edge 16. The side walls 130 form an angle (α) relative to the side edges 18 and 20, and the side walls 130 form another angle (β) relative to the end walls 140 of the cut outs 26.

The heater as taught herein may further include: one or more electrodes that include one or more terminals; wherein the one or more terminals are located anywhere on the one or more electrodes; wherein one or more electrical conductors are attached to the first electrically functional layer, second electrically functional layer, or both; wherein an electrical conductor is attached using laser welding; wherein an electrical conductor is attached by soldering; wherein the electrical connection is free of rivets; wherein an electrical connection is made using conductive glue and or conductive tape; wherein the electrical connection is made using low pressure molding technology; wherein the electrical connector is attached without creating a hole in the carrier; wherein the first electrically functional layer, second electrically functional layer, or both includes a copper based ink; wherein the first electrically functional layer, second electrically functional layer, or both includes a silver based ink; wherein a high temperature setting has a duty cycle of between about 80 percent and about 100 percent; wherein a medium temperature setting has a duty cycle of between about 60 percent and about 80 percent; wherein a low temperature setting has duty cycle of between about 40 percent and 60 percent; wherein the heater is placed between layers of the trim layer, and the trim layer and heater are placed on the cushion or back; wherein any of the first electrically functional layer, second electrically functional layer, third layer, or a combination thereof are screen printed on the carrier, wherein the first electrically functional layer has a different composition or a different resistance than the second electrically functional layer or a combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A heater comprising:
   i. a carrier including:
      1. a periphery including a first side edge and a second side edge;
      2. one or more internal slits; and
      3. one or more cutouts, wherein the first side edge and the second side edge each include a cutout;
   ii. a first electrically functional layer that is made of a conductive material comprising:
      1. a first electrode that substantially extends around the periphery of the carrier in a generally continuous manner; and
      2. a second electrode that substantially circumscribes at least a portion of the one or more internal slits;
   iii. a second electrically functional layer that is made of a resistive material;
   iii. one or more electrical conductors attached to the first electrically functional layer;
   wherein the heater is attached to an area to be heated by placing an attachment device over a portion of the heater and securing one or both ends of the attachment device to the area to be heated; and
   wherein a portion of the carrier is free of the second electrically functional layer.

2. The heater of claim 1, wherein the cutout of the first side edge and the cutout of the second edge are located symmetrically on the carrier to create a neck portion therebetween, wherein the neck portion is free of the second electrically functional layer.

3. The heater of claim 2, wherein the neck portion includes an internal cutout that separates the neck portion into two sections, and wherein one or more internal slits are located above the internal cutout and one or more internal slits are located below the internal cutout.

4. The heater of claim 3, wherein the second electrode substantially circumscribes at least a portion of the internal cutout and the one or more internal slits in a generally continuous manner.

5. The heater of claim 1, wherein the first electrode is without any discretely defined ends.

6. The heater of claim 1, further including a third layer covering the carrier, the first electrically functional layer, the second electrically functional layer, or combination thereof.

7. The heater of claim 1, wherein the heater is part of a ventilation system, wherein the ventilation system includes one or more air movers.

8. The heater of claim 7, wherein the carrier includes one or more features to allow the one or more air movers to pass air through the carrier.

9. The heater of claim 1, wherein the heater is part of an actively cooled system, and wherein the carrier includes one or more features to allow one or more air movers to pass air through the carrier.

10. The heater of claim 1, wherein the heater is placed over an air distributor that includes one or more air movers that move air through one or more features of the carrier, wherein the air distributor includes a spacer material.

11. The heater of claim 1, wherein the heater is integrated into and heats a structure, panel, floor, wall, or a combination thereof.

12. The heater of claim 1, wherein the one or more electrical conductors are attached via a mechanical electrical connector that includes only an attachment portion and a backing portion, and the electrical conductor is a wire with a gauge of 18 or smaller.

13. The heater of claim 1, wherein the heater is used with an air distributor, and the heater is one wall of the air distributor.

14. The heater of claim 1, wherein the carrier includes a lobed portion and the one or more electrical conductors are two electrical conductors and the two electrical conductors are connected to the first electrically functional layer via electric terminals that are located in the lobed portion.

15. The heater of claim 14, wherein the lobe is symmetrically located on the carrier by an axis defined from midpoints along a top edge and a bottom edge of the carrier.

16. The heater of claim 3, wherein the internal cutout, the one or more internal slits that are located above the internal cutout, and the one or more internal slits that are located below the internal cutout divide the heater into four quadrants and each of the four quadrants includes one or more features.

17. The heater of claim 3, wherein the internal cutout, the one or more internal slits located above the internal cutout, and the one or more internal slits below the internal cutout are sized to connect to form a single aperture.

18. A heater comprising:
i. a carrier including:
   1. a periphery including a first side edge, and a second side edge;
   2. one or more internal slits;
   3. one or more cutouts,
      wherein first side edge and the second side edge each include a cutout, and the cutouts are symmetrically located to form a neck portion therebetween; and
   4. one or more internal cutouts;
ii. a first electrically functional layer that is made of a conductive material comprising:
   1. a first electrode that substantially circumscribes at least a portion of the carrier in a generally continuous manner without any discretely defined ends; and
   2. a second electrode, wherein the second electrode substantially circumscribes at least a portion of the one or more internal slits;
iii. a second electrically functional layer that is made of a resistive material;
iv. one or more electrical conductors attached to the first electrically functional layer;
wherein the neck portion includes an internal cutout that separates the neck portion into two sections;
wherein the neck portion is free of the second electrically functional layer;
wherein one or more internal slits are located above the internal cutout and one or more internal slits are located below the internal cutout; and
wherein the internal cutout and the one or more internal slits located above and below the internal cutout divide the heater into four quadrants, and each of the four quadrants include one or more features.

19. The heater of claim 18, wherein the heater is integrated into and heats a structure, panel, floor, wall, or a combination thereof.

20. The heater of claim 18, wherein the carrier includes one or more lobed portions, wherein the one or more lobed portions include one or both the first electrode and the second electrode and one or more electrical terminals attached to the one or both of the first and second electrodes.

* * * * *